US010021667B2

United States Patent
Akkarakaran et al.

(10) Patent No.: US 10,021,667 B2
(45) Date of Patent: Jul. 10, 2018

(54) POSITIONING IN BEAMFORMED COMMUNICATIONS

(71) Applicant: QUALCOMM Incorporated, San Diego, CA (US)

(72) Inventors: Sony Akkarakaran, Poway, CA (US); Tao Luo, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/457,985

(22) Filed: Mar. 13, 2017

(65) Prior Publication Data
US 2017/0374637 A1 Dec. 28, 2017

Related U.S. Application Data

(60) Provisional application No. 62/354,028, filed on Jun. 23, 2016.

(51) Int. Cl.
*H04W 64/00* (2009.01)
*H04B 7/06* (2006.01)
(Continued)

(52) U.S. Cl.
CPC ............ *H04W 64/00* (2013.01); *G01S 5/10* (2013.01); *G01S 5/12* (2013.01); *H04B 7/0617* (2013.01);
(Continued)

(58) Field of Classification Search
CPC .................................................. H04W 64/00
(Continued)

(56) References Cited

U.S. PATENT DOCUMENTS

2013/0324154 A1* 12/2013 Raghupathy ............ G01S 19/10
455/456.1
2015/0188678 A1    7/2015 Wu et al.
(Continued)

FOREIGN PATENT DOCUMENTS

WO    WO-2015027118 A1    2/2015

OTHER PUBLICATIONS

Fischer, "Observed Time Difference of Arrival (OTDOA) Positioning in 3GPP LTE," Jun. 6, 2014, 62 Pages, XP055284784, Qualcomm Technologies, Inc.
(Continued)

*Primary Examiner* — Michael T Vu
(74) *Attorney, Agent, or Firm* — Holland & Hart LLP

(57) ABSTRACT

Methods, systems, and devices for wireless communication are described. A base station may receive a first measurement report from a user equipment (UE) that includes an indication of a measurement parameter associated with a first beamformed reference signal. The base station may receive additional measurement reports from the UE for additional base stations. The additional measurement reports may include an indication of measurement parameters associated with additional beamformed reference signals transmitted by the additional base stations. The base station may identify a location of the UE based on the first measurement report and the additional measurement report. Alternatively, the UE may transmit multiple beamformed sounding reference signals to multiple base stations, and a single base station may identify a location of the UE based on multiple reports collected from the multiple base stations.

30 Claims, 18 Drawing Sheets

(51) Int. Cl.
*H04L 5/00* (2006.01)
*H04W 24/10* (2009.01)
*G01S 5/10* (2006.01)
*G01S 5/12* (2006.01)
*G01S 5/00* (2006.01)
*G01S 5/02* (2010.01)
*H04W 16/28* (2009.01)

(52) U.S. Cl.
CPC ........... *H04L 5/0051* (2013.01); *H04W 24/10* (2013.01); *H04W 64/006* (2013.01); *G01S 5/0036* (2013.01); *G01S 5/0226* (2013.01); *H04W 16/28* (2013.01)

(58) Field of Classification Search
USPC ............................................ 455/456.1–456.6
See application file for complete search history.

(56) References Cited

U.S. PATENT DOCUMENTS

2015/0289311 A1* 10/2015 Chang ................... H04W 24/04
370/216
2015/0382205 A1* 12/2015 Lee ....................... H04B 7/0417
370/329

OTHER PUBLICATIONS

ISA/EP, International Search Report and Written Opinion of the International Searching Authority, Int'l Application No. PCT/US2017/038723, dated Sep. 29, 2017, European Patent Office, Rijswijk, NL, 19 pgs.

* cited by examiner

POSITIONING IN BEAMFORMED COMMUNICATIONS

CROSS REFERENCES

The present application for patent claims priority to U.S. Provisional Patent Application No. 62/354,028 by Akkarakaran, et al., entitled "Positioning In Millimeter-Wave Communications," filed Jun. 23, 2016, assigned to the assignee hereof.

INTRODUCTION

The following relates generally to location determination in beamformed communication, such as millimeter-wave (mmW) wireless communication, and more specifically to positioning in mmW communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Wireless communication systems may operate in mmW frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communications systems, transmissions from the base station and/or the UE may be beamformed.

UEs may be mobile and traverse the coverage areas of different base stations of the wireless communications system. UE location may be important for various functions, e.g., location-based services, emergency response services, etc. Determining the location of UEs operating in wireless networks may be a challenge owing to the mobility of users and the dynamic nature of both the environment and radio signals. Traditional wireless networks may determine the UE location using dedicated signaling, e.g., by broadcasting positioning reference signals (PRSs) throughout a coverage area.

mmW communication promises to bring gigabit speeds to cellular networks, due to availability of large amounts of bandwidth. The unique challenges of heavy path-loss faced by mmW communication systems necessitate new techniques such as hybrid beamforming that is joint digital and analog beamforming, which are not present in third generation (3G) and/or fourth generation (4G) wireless communication systems. Hybrid beamforming may support beamformed signals having a more narrow width than using conventional beamforming techniques. Support for hybrid beamforming may additionally result in changes to the positioning procedures and the transmission of the reference signals used for positioning.

SUMMARY

The described techniques relate to improved methods, systems, devices, or apparatuses that support positioning in beamformed communications, such as mmW communications.

A method of location determination in beamformed communication, is described. The method may include transmitting by a UE to a base station, a first measurement report, the first measurement report indicating a measurement parameter associated with a first beamformed reference signal, and transmitting by the UE to the base station, additional measurement reports for additional base stations, the additional measurement reports each indicating measurement parameters associated with additional beamformed reference signals that are transmitted at different times in accordance to a time offset schedule by the additional base stations, wherein the first measurement report and the additional measurement reports are configured to allow the base station to identify a location of the UE.

An apparatus for location determination in beamformed communication, is described. The apparatus may include means for transmitting by a UE to a base station, a first measurement report, the first measurement report indicating a measurement parameter associated with a first beamformed reference signal, and means for transmitting by the UE to the base station, additional measurement reports for additional base stations, the additional measurement reports each indicating measurement parameters associated with additional beamformed reference signals that are transmitted at different times in accordance to a time offset schedule by the additional base stations, wherein the first measurement report and the additional measurement reports are configured to allow the base station to identify a location of the UE.

Another apparatus for location determination in beamformed communication, is described. The apparatus may include a processor, memory in electronic communication with the processor, and instructions stored in the memory. The instructions may be operable to cause the processor to transmit by a UE to a base station, a first measurement report, the first measurement report indicating a measurement parameter associated with a first beamformed reference signal, and transmit by the UE to the base station, additional measurement reports for additional base stations, the additional measurement reports each indicating measurement parameters associated with additional beamformed reference signals that are transmitted at different times in accordance to a time offset schedule by the additional base stations, wherein the first measurement report and the additional measurement reports are configured to allow the base station to identify a location of the UE.

A non-transitory computer-readable medium for location determination in beamformed communication, is described. The non-transitory computer-readable medium may include instructions operable to cause a processor to transmit by a UE to a base station, a first measurement report, the first measurement report indicating a measurement parameter associated with a first beamformed reference signal, and transmit by the UE to the base station, additional measurement reports for additional base stations, the additional measurement reports each indicating measurement paramnals that are transmitted at different times in accordance to a time offset schedule by the additional base stations, wherein the first measurement report and the additional measurement reports are configured to allow the base station to identify a location of the UE Some examples of the method, apparatus, and non-transitory computer-readable medium described above may further include processes, features, means, or instructions for receiving the first beamformed reference signal as a non-positioning beam management signal or a measurement reference signal. Some examples of the method, apparatus, and non-transitory computer-readable medium described above may further include processes, features, means, or instructions for receiving the first beamformed reference signal as a PRS.

Some examples of the method, apparatus, and non-transitory computer-readable medium described above may further include processes, features, means, or instructions for receiving, from the base station, control signaling associated with the PRS prior to receiving the first beamformed reference signal. Some examples of the method, apparatus, and non-transitory computer-readable medium described above may further include processes, features, means, or instructions for receiving from the base station, the PRS over a subset of beams directed towards the UE.

In some examples of the method, apparatus, and non-transitory computer-readable medium described above, receiving the PRS further comprises: receiving the PRS for each of multiple carriers that share a same beam by sharing a same antenna panel and by being aligned in time.

In some examples of the method, apparatus, and non-transitory computer-readable medium described above, transmitting the first measurement report further comprises: transmitting, by the UE, a single first measurement report indicating measurement parameters associated with each of the multiple carriers. In some examples of the method, apparatus, and non-transitory computer-readable medium described above, at least one of the additional beamformed reference signals is associated with a radio access technology (RAT) that is different from a RAT associated with the first beamformed reference signal.

A method of location determination in beamformed communication, is described. The method may include receiving a first measurement report from a UE, the first measurement report indicating a measurement parameter associated with a first beamformed reference signal, receiving additional measurement reports from the UE for additional base stations, the additional measurement reports each indicating measurement parameters associated with additional beamformed reference signals transmitted by the additional base stations, and identifying a location of the UE based at least in part on the first measurement report and the additional measurement reports.

An apparatus for location determination in beamformed communication, is described. The apparatus may include means for receiving a first measurement report from a UE, the first measurement report indicating a measurement parameter associated with a first beamformed reference signal, means for receiving additional measurement reports from the UE for additional base stations, the additional measurement reports each indicating measurement parameters associated with additional beamformed reference signals transmitted by the additional base stations, and means for identifying a location of the UE based at least in part on the first measurement report and the additional measurement reports.

Another apparatus for location determination beamformed communication, is described. The apparatus may include a processor, memory in electronic communication with the processor, and instructions stored in the memory. The instructions may be operable to cause the processor to receive a first measurement report from a UE, the first measurement report indicating a measurement parameter associated with a first beamformed reference signal, receive additional measurement reports from the UE for additional base stations, the additional measurement reports each indicating measurement parameters associated with additional beamformed reference signals transmitted by the additional base stations, and identify a location of the UE based at least in part on the first measurement report and the additional measurement reports.

A non-transitory computer-readable medium for location determination in beamformed communication, is described. The non-transitory computer-readable medium may include instructions operable to cause a processor to receive a first measurement report from a UE, the first measurement report indicating a measurement parameter associated with a first beamformed reference signal, receive additional measurement reports from the UE for additional base stations, the additional measurement reports each indicating measurement parameters associated with additional beamformed reference signals transmitted by the additional base stations, and identify a location of the UE based at least in part on the first measurement report and the additional measurement reports.

Some examples of the method, apparatus, and non-transitory computer-readable medium described above may further include processes, features, means, or instructions for transmitting the first beamformed reference signal as a non-positioning beam management signal or a measurement reference signal. Some examples of the method, apparatus, and non-transitory computer-readable medium described above may further include processes, features, means, or instructions for transmitting the first beamformed reference signal as a PRS.

Some examples of the method, apparatus, and non-transitory computer-readable medium described above may further include processes, features, means, or instructions for transmitting, to the UE, control signaling associated with the PRS prior to transmitting the first beamformed reference signal. Some examples of the method, apparatus, and non-transitory computer-readable medium described above may further include processes, features, means, or instructions for broadcasting the PRS via beam sweeping.

Some examples of the method, apparatus, and non-transitory computer-readable medium described above may further include processes, features, means, or instructions for transmitting the PRS over a subset of beams directed towards the UE. Some examples of the method, apparatus, and non-transitory computer-readable medium described above may further include processes, features, means, or instructions for selecting the subset of beams based at least in part on a historical beam management report received from the UE.

Some examples of the method, apparatus, and non-transitory computer-readable medium described above may further include processes, features, means, or instructions for selecting the subset of beams based at least in part on a prediction that the UE may be located in a location that may be different from one or more locations suggested by a historical beam management report received from the UE.

In some examples of the method, apparatus, and non-transitory computer-readable medium described above, receiving additional measurement reports from the UE further comprises: receiving additional measurement reports indicating measurement parameters associated with PRSs that may be transmitted at different times in accordance to a time offset schedule.

In some examples of the method, apparatus, and non-transitory computer-readable medium described above, transmitting the PRS further comprises: transmitting the PRS for each of multiple carriers that share a same beam by sharing a same antenna panel and by being aligned in time. In some examples of the method, apparatus, and non-transitory computer-readable medium described above, receiving the first measurement report further comprises: receiving, from the UE, a single first measurement report indicating measurement parameters associated with each of the multiple carriers.

Some examples of the method, apparatus, and non-transitory computer-readable medium described above may further include processes, features, means, or instructions for transmitting the first beamformed reference signal according to a periodic schedule, an aperiodic schedule, on an as-needed basis, or combinations thereof.

In some examples of the method, apparatus, and non-transitory computer-readable medium described above, the measurement parameters may be associated with timing measurements of the first beamformed reference signal and the additional reference signals, strength measurements of the first beamformed reference signal and the additional reference signals, or combinations thereof.

In some examples of the method, apparatus, and non-transitory computer-readable medium described above, identifying the location of the UE further comprises: computing the location of the UE based at least in part on the first measurement report and the additional measurement reports. In some examples of the method, apparatus, and non-transitory computer-readable medium described above, at least one of the additional beamformed reference signals may be associated with a RAT that may be different from a RAT associated with the first beamformed reference signal.

A method of location determination in beamformed communication, is described. The method may include receiving a first beamformed sounding reference signal (SRS) from a UE, determining a measurement parameter associated with the first beamformed SRS, receiving measurement reports from additional base stations, the measurement reports each indicating measurement parameters associated with additional beamformed SRSs beamformed and transmitted by the UE to the additional base stations, and identifying a location of the UE based at least in part on the determined measurement parameter and the additional measurement reports.

An apparatus for location determination in beamformed communication, is described. The apparatus may include means for receiving a first beamformed SRS from a UE, means for determining a measurement parameter associated with the first beamformed SRS, means for receiving measurement reports from additional base stations, the measurement reports each indicating measurement parameters associated with additional beamformed SRSs beamformed and transmitted by the UE to the additional base stations, and means for identifying a location of the UE based at least in part on the determined measurement parameter and the additional measurement reports.

Another apparatus for location determination in beamformed communication, is described. The apparatus may include a processor, memory in electronic communication with the processor, and instructions stored in the memory. The instructions may be operable to cause the processor to receive a first beamformed SRS from a UE, determine a measurement parameter associated with the first beamformed SRS, receive measurement reports from additional base stations, the measurement reports each indicating measurement parameters associated with additional beamformed SRSs beamformed and transmitted by the UE to the additional base stations, and identify a location of the UE based at least in part on the determined measurement parameter and the additional measurement reports.

A non-transitory computer-readable medium for location determination in beamformed communication, is described. The non-transitory computer-readable medium may include instructions operable to cause a processor to receive a first beamformed SRS from a UE, determine a measurement parameter associated with the first beamformed SRS, receive measurement reports from additional base stations, the measurement reports each indicating measurement parameters associated with additional beamformed SRSs beamformed and transmitted by the UE to the additional base stations, and identify a location of the UE based at least in part on the determined measurement parameter and the additional measurement reports.

Some examples of the method, apparatus, and non-transitory computer-readable medium described above may further include processes, features, means, or instructions for transmitting to the UE an indication of the additional base stations to be used by the UE for transmission of the additional beamformed SRSs. Some examples of the method, apparatus, and non-transitory computer-readable medium described above may further include processes, features, means, or instructions for selecting the additional base stations based at least in part on historical beam management reports received from the UE.

In some examples of the method, apparatus, and non-transitory computer-readable medium described above, selecting the additional base stations further comprises: selecting the additional base stations based at least in part on a prediction that the UE may be located in a location that may be different from one or more locations suggested by the historical beam management report received from the UE.

In some examples of the method, apparatus, and non-transitory computer-readable medium described above, receiving the first beamformed SRS from the UE further comprises: receiving multiple first beamformed SRSs from the UE, each of the first SRSs being associated with different carriers and being transmitted by the UE in a same transmit time interval (TTI). Some examples of the method, apparatus, and non-transitory computer-readable medium described above may further include processes, features, means, or instructions for combining the multiple first beamformed SRSs to determine the measurement parameter associated with the first beamformed SRS.

In some examples of the method, apparatus, and non-transitory computer-readable medium described above, identifying the location of the UE further comprises: computing the location of the UE based at least in part on the determined measurement parameter and the additional measurement reports. In some examples of the method, apparatus, and non-transitory computer-readable medium described above, at least one of the additional beamformed SRSs may be associated with a RAT that may be different from a RAT associated with the first beamformed SRS.

DETAILED DESCRIPTION

Figure 1:
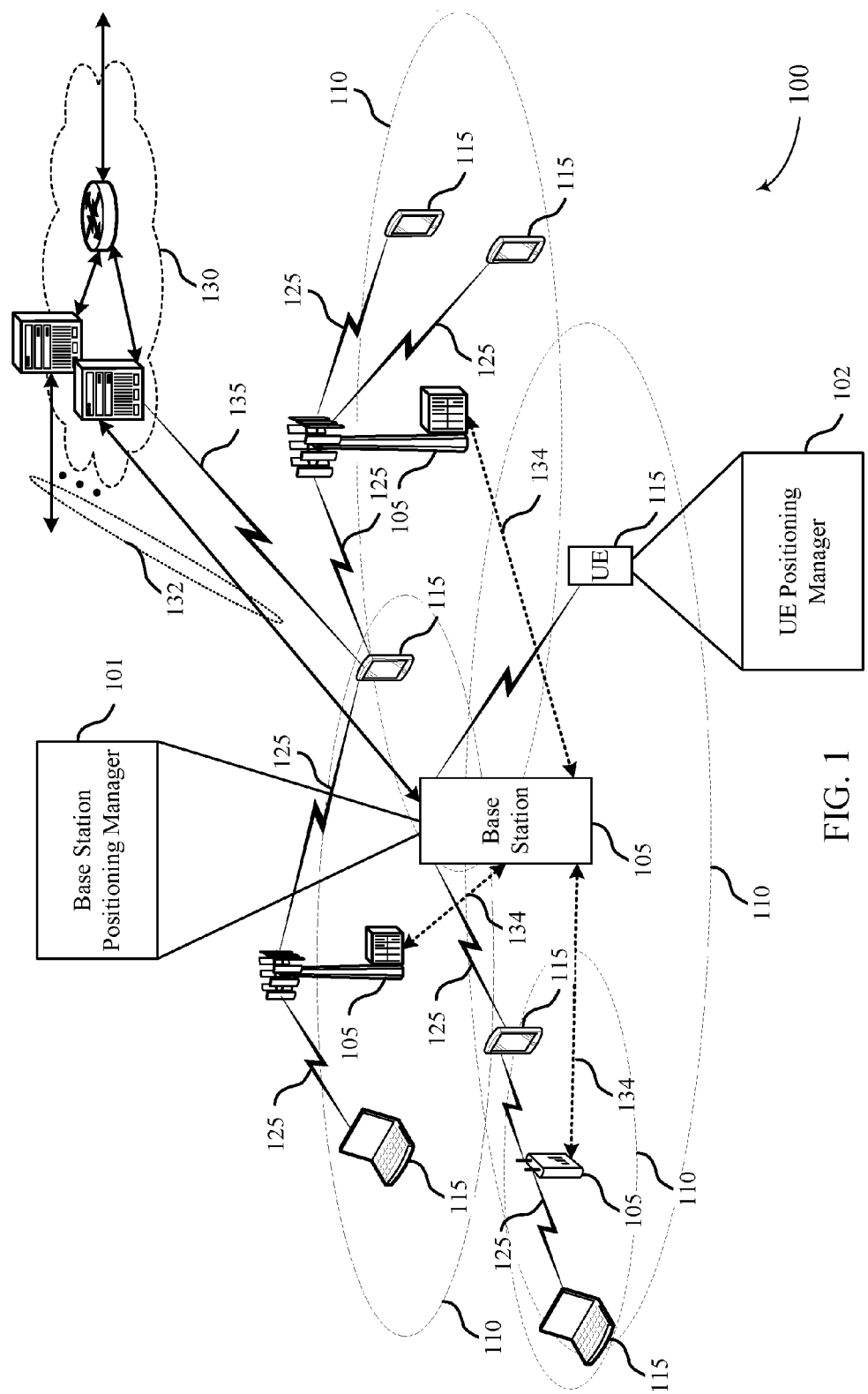
FIG. 1 illustrates an example of a wireless communication system that supports positioning in beamformed communications, such as mmW communications, in accordance with one or more aspects of the present disclosure.

Some wireless communication systems (e.g., LTE) may use two types of positioning mechanisms—downlink-based (e.g., observed time difference of arrival (OTDOA)) and uplink-based (e.g., uplink time difference of arrival (UT-DOA)). In the downlink-based positioning, a PRS is transmitted with a certain periodicity on the downlink. The UE measures the difference between the arrival times of the PRS from multiple eNodeBs, and reports this back to the network. The network uses these reports and the known base station locations in order to determine the UE location. The PRS may be broadcast from each base station with strong enough power to be heard not only by the UEs in that cell, but also by those in neighboring cells. Accurate positioning may use reports from multiple base stations.

Uplink-based positioning may be transparent to the UE, and may include the network measuring a time-delay of arrival of the UE uplink at various base stations. This may be feasible because the UE transmit antenna pattern is usually omnidirectional, especially for the reference signals (e.g., sounding reference signal (SRS)) from which the uplink timing is measured. These reference signal transmissions from the UE may be received at multiple non-co-located base stations. However, in beamformed communication systems, such as mmW communication systems, due to use of uplink beamforming, the SRS may be heard reliably by one base station, e.g., heard by the base station in the direction of the beamformed signal.

Aspects of the disclosure are initially described in the context of a wireless communications system. For example, in downlink-based location determination, a base station may transmit a measurement reference signal (MRS) to a UE and receive a measurement report from the UE. Signals used for measurement are referred to as MRS. Any one or combination of several physical reference signals may serve as the MRS (e.g., synchronization signals, beamforming reference signal (BRS), channel state information-reference signal (CSI-RS), etc). The measurement report may indicate a measurement parameter for the MRS. The base station may additionally or alternatively receive additional measurement reports from the UE for other base stations. Each measurement report may indicate measurement parameters for MRSs associated with the other base stations. The base station may determine the location of the UE based on the measurement reports. For uplink-based location determination, the base station may receive a beamformed SRS (BSRS) from the UE and determine a measurement parameter associated with the BSRS. The base station may additionally or alternatively receive measurement reports from other base stations that indicate measurement parameters for BSRSs transmitted from the UE to the other base stations. In some examples, any location determination entity may receive measurement reports from additional base stations. In some examples, the location determination entity may be located elsewhere in the network and may receive measurement reports from the additional base stations, wherein the beamformed SRSs are transmitted to the additional base stations by the UE 115. In some examples, the location determination entity may be a serving base station or another entity such as an enhanced serving mobile location center (E-SMLC). The base station may determine the location of the UE based on the measurement parameters, as determined by the base station and/or received in the measurement reports.

Aspects of the disclosure are further illustrated by and described with reference to apparatus diagrams, system diagrams, and flowcharts that relate to positioning in beamformed communications, such as mmW communications.

FIG. 1 illustrates an example of a wireless communications system 100 in accordance with one or more aspects of the present disclosure. The wireless communications system 100 includes network access devices (e.g., base stations 105, gNodeBs (gNBs), and/or radio heads (RHs)), UEs 115, and a core network 130. In some examples, the wireless communications system 100 may be a LTE (or LTE-Advanced) network. In some examples, the wireless communications system 100 may be an advanced wireless communication system using beamforming, such as a mmW wireless communication system (i.e., one operating in the millimeter wave spectrum).

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may communicate with the core network 130 through communication link 135. A UE 115 may additionally or alternatively be referred to as a mobile station, a subscriber station, a remote unit, a wireless device, an access terminal (AT), a handset, a user agent, a client, or like terminology. A UE 115 may additionally or alternatively be a cellular phone, a wireless modem, a handheld device, a personal computer, a tablet, a personal electronic device, a machine-type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. In some examples, base stations 105 may additionally or alternatively be referred to gNBs.

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Specifically, wireless communications system 100 may operate in mmW frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device, such as a UE 115, may select a beam direction for communicating with a network by selecting the strongest beam from among a number of reference signals transmitted by a base station.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Wireless communications system 100 may be or include a multicarrier beamformed communication system, such as a mmW wireless communication system. Broadly, aspects of wireless communications system 100 may include a UE 115 and a base station 105 using MRSs for UE location determination. For downlink-based UE location determination, for example, a base station 105 may include a base station positioning manager 101 that may receive a measurement report from a UE 115 that indicates a measurement parameter for an MRS transmitted by the base station 105. The base station positioning manager 101 may receive additional measurement reports from the UE for additional base stations (e.g., other base stations 105) that indicate measurement parameters for MRSs from the additional base stations. The base station positioning manager 101 may identify or otherwise determine the location of the UE 115 based on the measurement reports. For uplink-based UE location determination, the base station positioning manager 101 may receive a BSRS from the UE 115 and determine a measurement parameter for the BSRS. The base station positioning manager 101 may receive measurement reports from additional base stations that indicate measurement parameters for the respective additional base stations with respect to the UE 115. The base station positioning manager 101 may determine the location of the UE 115 based on the measurement parameters.

From the UE 115 perspective, the UE 115 may include a UE positioning manager 102 that may transmit BSRSs to base stations 105. The BSRSs may be transmitted according to a sweeping pattern and, in some aspects, transmitted according to a timing offset. For example, each BSRS may be transmitted in a different TTI.

Figure 2:
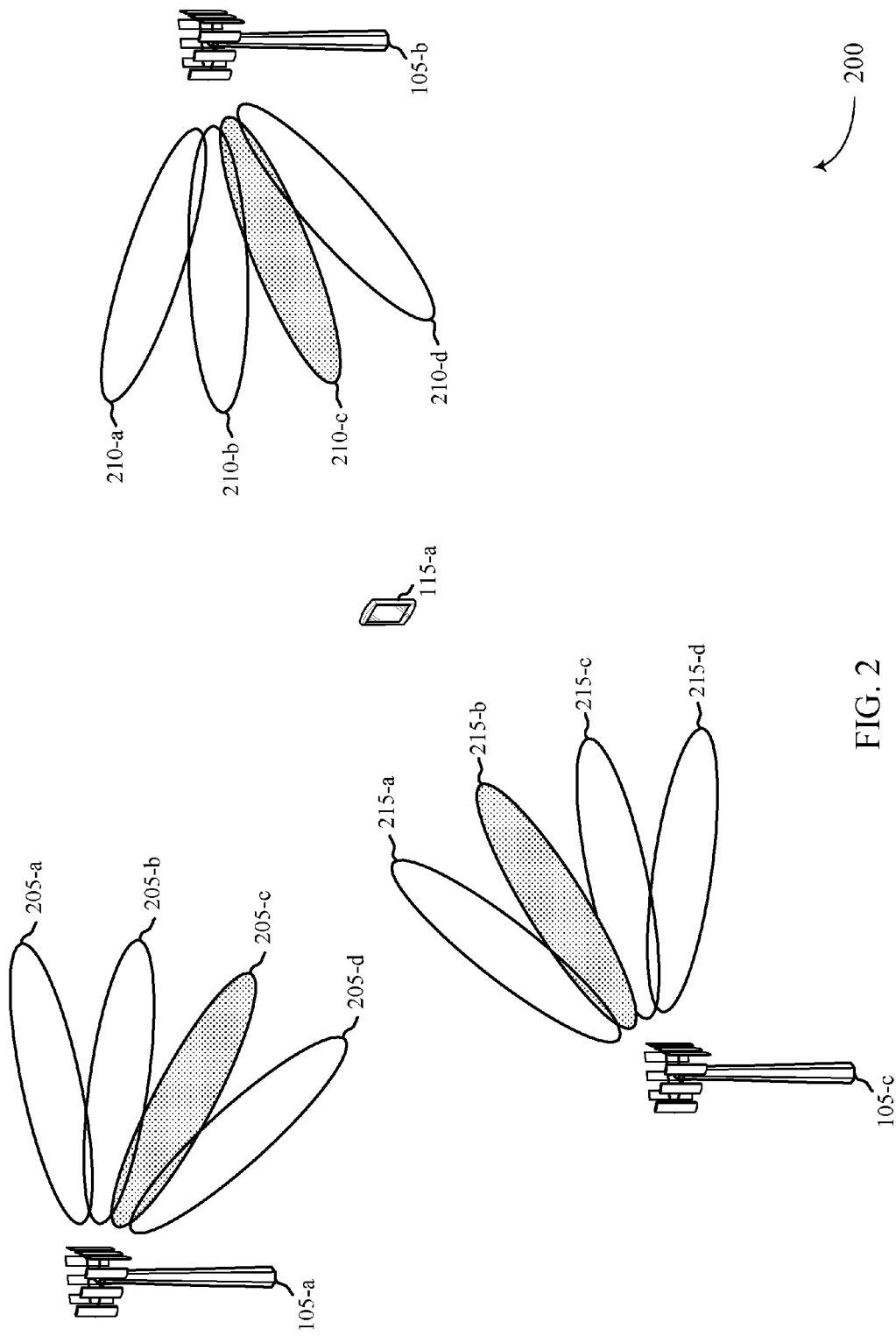
FIG. 2 illustrates an example of a wireless communication system that supports positioning in beamformed communications, such as mmW communications, in accordance with one or more aspects of the present disclosure.

FIG. 2 illustrates an example of a wireless communications system 200 for positioning in beamformed communications, such as mmW communications, in accordance with one or more aspects of the present disclosure. Wireless communications system 200 may be an example of aspects of wireless communications system 100 of FIG. 1. Wireless communications system 200 may be a beamformed communication system, such as a mmW wireless communication system. Wireless communications system 200 may include a UE 115-a, a base station 105-a, a base station 105-b, and/or a base station 105-c, which may be examples of the corresponding devices of FIG. 1. Broadly, wireless communications system 200 illustrates aspects of downlink based UE 115-b location determination in a beamformed wireless communications system.

In some examples, base station 105-a may be a serving base station for UE 115-a. Base stations 105-b and 105-c may be neighbor base stations for UE 115-a. Base stations 105-a, 105-b, and/or 105-c may be mmW base stations that transmit beamformed signals. The transmissions from base stations 105-a, 105-b, and/or 105-c may be beamformed transmissions that are directional towards UE 115-a. For example, base station 105-a may transmit MRSs 205, base station 105-b may transmit MRSs 210, and base station 105-c may transmit MRSs 215.

MRSs 205, 210, and/or 215 may be non-positioning beam management signals. Alternatively, MRSs 205, 210, and/or 215 may include PRSs piggy-backed to respective MRSs. That is, MRSs 205, 210, and/or 215 may include PRSs that are configured (e.g., scheduled, signaled, etc.) specifically for determining the location of UE 115-a. In another example, MRSs 205, 210, and/or 215 may be beamformed signals that are not specifically configured for determining the location of UE 115-*a*. For example, various beam management signals may be repurposed for UE 115-*a* location determination. Moreover, the structure of the beam management signals may additionally or alternatively be adjusted to support positioning in beamformed wireless communication systems, e.g., the peak gain of the beam, the beam width, etc. Such beam management signals may be associated with channel measurement and reporting procedures, control information transmissions, etc. In some examples, UE 115-*a* location determination may include using a combination of PRSs and non-positioning beam management signals.

In beamformed wireless communication systems (e.g., wireless communications system 200), for MRSs 205, 210, and/or 215 to penetrate long distances, the MRSs 205, 210, and/or 215 may use high beamforming gain in order to overcome the relatively poor propagation environment at mmW carrier frequencies. Additionally or alternatively, MRSs 205, 210, and/or 215 may cover a narrow angular portion of the coverage area of the respective base station 105-*a*, 105-*b*, and/or 105-*c*. Thus, in each transmission window (e.g., TTI), the MRSs 205, 210, and/or 215 beam direction may be swept to cover the entire coverage area of the base station. For example, base station 105-*a* may transmit MRS 205-*a* during a first TTI, transmit MRS 205-*b* during a second TTI, and so on. Base station 105-*b* may transmit MRS 210-*a* during a first TTI, transmit MRS 210-*b* during a second TTI, and so on. Similarly, base station 105-*c* may transmit MRS 215-*a* during a first TTI, transmit MRS 215-*b* during a second TTI, etc. The MRS transmissions may continue in a sweeping pattern around the coverage area of each base station, e.g., each base station may transmit more than four MRSs so as to cover their respective coverage areas. MRSs 205-*c*, 210-*c*, and 215-*b* may be directed towards UE 115-*a*.

The beam sweep cycles from neighboring base stations 105-*b* and/or 105-*c* may be coordinated to minimize collision between the beams. For example and during a first TTI, base station 105-*a* may transmit MRS 205-*a*, base station 105-*b* may transmit 210-*d*, and base station 105-*c* may transmit an MRS in a direction opposite from the location of base stations 105-*a* and 105-*b* (not shown). One example of coordinating the beam sweep cycle may include timing offsets that may be reported between the base stations for multiple beams. The beam-index (e.g., an indicator of the beam number and/or direction of the beam transmission) may be included with the timing offset report, or could be inferred from a pre-specified order of reporting beams. Another example of coordinating the beam sweep cycle may include frequency offsets between the beams transmitted by different base stations, such as base stations 105-*a*, 105-*b* and/or 105-*c*. For example, base station 105-*a* may transmit using a first frequency where base stations 105-*b* and/or 105-*c* may transmit using a second frequency that is different from the first frequency. Some examples of coordinating the beam sweep cycle may include a combination of timing offsets and frequency offsets.

Thus, while the overhead associated with MRS transmissions may be increased due to beam-sweeping the MRS transmissions, the overhead additionally or alternatively results in improved positioning accuracy of multiple beam measurement reports. In some aspects, the improvement in positioning accuracy from multiple measurement reports is more significant when the base stations are not co-located, whereas multiple beams from the same base station are usually co-located. However, with multiple antenna panels and remote-radio-head deployments for base stations 105-*a*, 105-*b*, and/or 105-*c*, it may be supported that even beams from the same base station are not co-located. Additionally or alternatively, even with co-located beams, some positioning accuracy improvement may be supported by averaging the reported timing differences across beams coming from co-located base stations.

In some aspects, the network may additionally or alternatively use information associated with the beam angular direction and spread in order to further improve the accuracy of the positioning. For example, the UE location may be identified based purely on MRS timing reports and the base station locations, without regard to beam directions. The boresight directions of the beams may be compared with the directions from the known base station locations to the computed UE location. If there is a significant mismatch between the boresight and the computed direction, it indicates an anomalous event, such as a reflected path, which could corrupt the location determination. The location may then be re-computed by disregarding the report from the suspected anomalous beam.

It may be noted that such an approach is possible even in legacy wireless communication systems (e.g., LTE), by beam-sweeping and creating a layout with several sectors, thus allowing increased accuracy from these approaches due to multiple beam measurements. For example, without any timing measurements, simply knowing the two strongest non-co-located cells seen by UE 115-*a* may allow an approximate estimate of the UE 115-*a* location, e.g., within the area of intersection of the beam patterns issuing from those two cells. However, by using narrow beams, the intersection area of the beams will be small and may thus give a more accurate position fix.

In some aspects, the beam-sweeping pattern of MRS transmissions 205, 210, and/or 215 may be on an orthogonal frequency division multiplexing (OFDM) symbol basis or on a subframe basis. Subframe-basis sweeping may indicate that the granularity of the number of OFDM symbol repetitions of each given beam direction corresponds to an integer number of subframes. This may provide the option to schedule other traffic in that subframe in a design where the MRS does not occupy the entire system bandwidth. OFDM symbol-basis sweeping may allow a finer granularity for the MRS repetition count, but add, at least to some degree, difficulty in scheduling other data during MRS transmission, since it may be preferred to send such data using a single beam over the entire subframe.

Thus, in some aspects the described techniques include MRS transmissions 205, 210, and/or 215 that are transmitted over the entire coverage area of a base station using a beam sweeping pattern. The MRSs 205, 210, and/or 215 may be specifically configured for or otherwise associated with UE 115-*a* location identification, e.g., PRSs.

In some examples, an MRS 205, 210, and/or 215 is transmitted by the base stations, 105-*a*, 105-*b*, 105-*c*, meaning that non-positioning beam management signals are transmitted. In other examples, a separate or piggybacked PRS is used. A separate PRS may allow for more repetition of the PRS signal in each PRS transmission to improve the positioning accuracy. While this motivation also applies in mmW systems as well, such mmW systems may have much larger bandwidth (which may additionally or alternatively be increased by carrier-aggregation), and thus at least a portion of the repetition gains may be captured by repetition in the frequency domain rather than in the time domain.

A hybrid approach may additionally or alternatively be considered where the MRS is present but with reduced or low periodicity, and both non-positioning beam management signals and the PRS are used for UE 115-*a* location determination. One example may include using unicast or multi-cast MRS, e.g., directing the PRS transmissions towards the UE 115-*a* (or group of UEs) whose position is to be determined. This may avoid or reduce having to beam-sweep the MRS over the entire coverage area of the cell, e.g., may use a single beam or a small subset of beams from the serving base station 105-*a* and/or the neighbor base stations 105-*b* and/or 105-*c*. The subset of beams may be identified based on previous beam-strength measurement reports of the UEs whose position is to be determined.

Thus, UE 115-*a* location in a beamformed wireless communication system may be determined based on UE 115-*a* downlink timing (e.g., OTDOA) and strength measurements of multiple beams from multiple base stations, where a beam is formed by analog and/or digital beamforming. Channels associated with the location measurements may include MRS transmissions in a beamformed wireless communication system that are used for beam management and/or PRS transmissions. The MRS transmissions may be coordinated to avoid interference between base stations 105-*a*, 105-*b*, and/or 105-*c*. The location measurements may be made on a combination of reference signals transmitted for beam management and reference signals transmitted exclusively for positioning (e.g., PRS). The reference signals may be sent periodically or when needed. The presence of PRS may be known through prior signaling to the UE 115-*a* that is making the measurement.

The MRS may be broadcast over the entire coverage area of a base station (or within a cell) according to a beam sweeping pattern or may include a subset of beams directed towards a particular UE (or groups of UEs) whose location is being measured. Thus, the MRS may be broadcast over the entire cell according to a beam sweeping and/or may be transmitted over a subset of beams directed towards a particular UE or a group of UEs whose position is being measured.

In some aspects, determining the approximate set of beams for the UE 115-*a* to measure may include identifying the subset of beams based on past beam-management reports for the serving base station and/or the neighbor base stations from the UE(s) whose position is being measured. In some aspects, the MRS transmission from neighboring base stations (e.g., MRSs 210 and 215) may be offset in time (e.g., staggered across consecutive subframes). The UE 115-*a* may determine the beams to be measured based on an indication by the network (e.g., base station 105-*a*) to the UE 115-*a*.

In some aspects, the network may indicate beams from cells which the UE 115-*a* has not previously detected or measured as strong beams, but which may be determined as likely to improve positioning accuracy based on previous reports from the UE 115-*a*. Aspects of the present disclosure may additionally or alternatively be used in a multicarrier beamformed wireless communication systems. For example in a multicarrier system, the MRS from multiple carriers that share the same antenna panel may be aligned in time and use the same beam. The UE 115-*a* may combine the MRS across carriers to determine the timing parameter, and transmit a single measurement report for the group of carriers. Alternatively, the UE 115-*a* may transmit separate measurement reports for each carrier. The measurement reports may be combined into a single message, or transmitted as multiple messages on one or more of the carriers.

Figure 3:
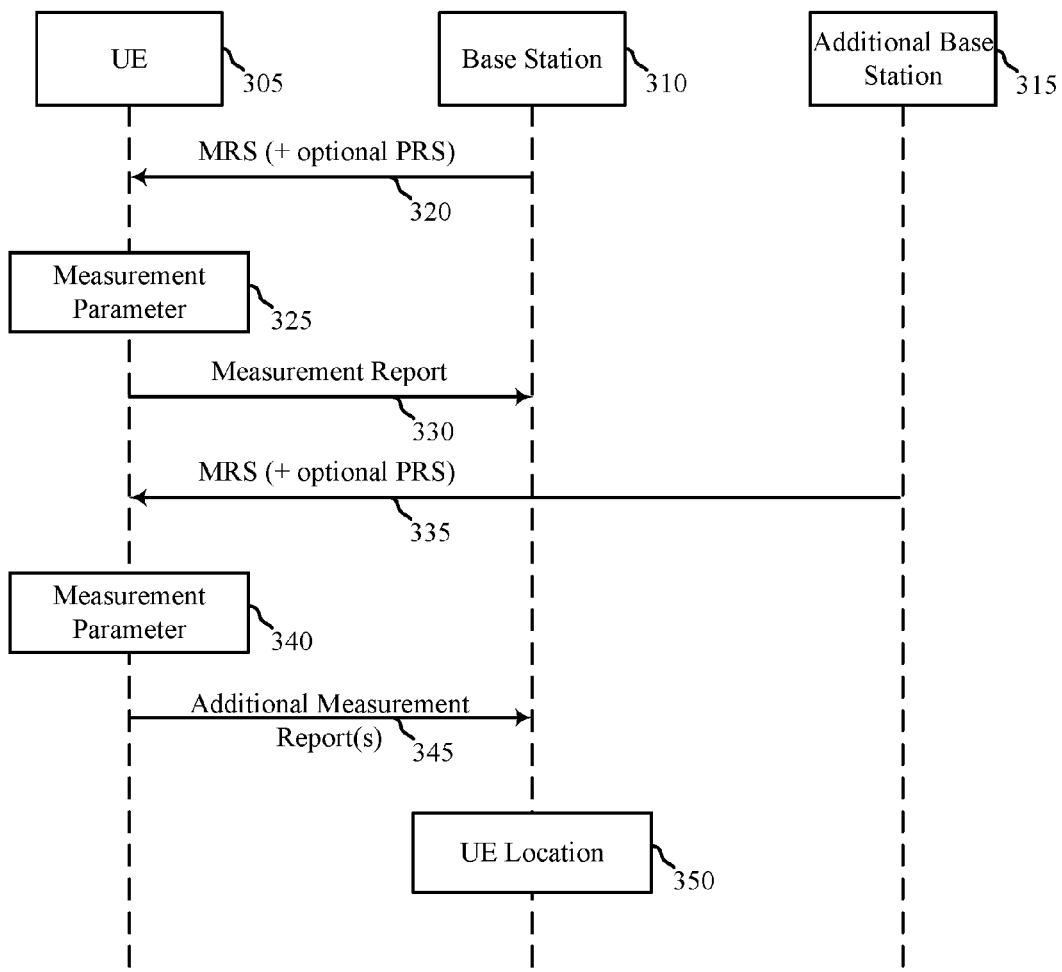
FIG. 3 illustrates an example of a process flow that supports positioning in beamformed communications, such as mmW communications, in accordance with one or more aspects of the present disclosure.

FIG. 3 illustrates an example of a process flow 300 for positioning in beamformed communications, such as mmW communications, in accordance with one or more aspects of the present disclosure. Process flow 300 may implement aspects of wireless communications system 100 and/or 200 of FIGS. 1 and/or 2. Process flow 300 may include a UE 305, a base station 310, and at least one additional base station 315, which may be examples of the corresponding devices of FIGS. 1 and/or 2. It is to be understood that the process flow 300 is not limited to one additional base station 315. Base station 310 may be a serving base station for UE 305.

At 320, base station 310 may transmit an MRS to UE 305. The MRS may be a non-positioning beam management signal and/or may optionally include a PRS. In the example where the MRS includes or is a PRS, the base station 310 may transmit control signaling associated with the PRS before transmitting the MRS. In some examples, the control signaling may specify one or more time instances at which the PRS from various base stations are present, such that the UE 305 may measure them. In some examples, the control signaling may additionally or alternatively specify that base station 310 will guarantee that during those time instances, the UE 305 will not be scheduled any other data, so that the UE 305 can focus only on measuring the PRS. In some examples, the PRS, especially from other base stations, may be present simultaneously with data from the serving base station 310. If the UE 305 has capability to simultaneously receive on multiple beams, then the guarantee from the base station 305 can be relaxed. In some examples, instead of not scheduling any other data, the base station 310 may reduce the rank of data transmission to allow the UE 305 to simultaneously perform both data reception and measurement of the one or more PRS.

The MRS (and/or PRS when applicable) may be broadcast to UE 305 via beam sweeping. The MRS (and/or PRS when applicable) may be transmitted over a subset of beams directed towards UE 305. The subset of beams may be selected based on historical beam management reports received from UE 305. The subset of beams may be selected based on a prediction that UE 305 is located in a location that is different from location(s) suggested by the historical beam management report received from UE 305.

AT 325, UE 305 may determine a measurement parameter associated with the MRS. The measurement parameter may include or be based on a timing parameter or measurement (e.g., OTDOA, time of arrival, angle of arrival, angle of departure at the UE 305, etc.). The measurement parameter may include or be based on a signal strength parameter, e.g., received power level, received power level relative to a reference power level, etc. At 330, the UE 305 may transmit a measurement report to base station 310. The measurement report may include an indication (e.g., a value, an index, a pointer to a look-up table, etc.) of the measurement parameter associated with the MRS (and optional PRS) transmitted at 320.

In some aspects, the MRS may be transmitted according to a periodic schedule, an aperiodic schedule, an as-needed basis, etc. When the optional PRS is transmitted in a multicarrier system, the base station 310 may transmit the PRS for each of the carriers that share a same beam by sharing an antenna panel and being aligned in time. Accordingly, the measurement report may be a single measurement report that provides an indication of the measurement parameters associated with each of the carriers.

At 335, the additional base station 315 (and other additional base stations neighboring UE 305) may transmit an MRS to UE 305. The MRS may be a non-positioning beam management signal and/or may optionally include a PRS. In the example where the MRS includes or is a PRS, the additional base station 315 may transmit control signaling associated with the PRS before transmitting the MRS. The MRS (and/or PRS when applicable) may be broadcast to UE 305 via beam sweeping. The MRS (and/or PRS when applicable) may be transmitted over a subset of beams directed towards UE 305. The subset of beams may be selected based on historical beam management reports received from UE 305 and/or a network entity. The subset of beams may be selected based on a prediction that UE 305 is located in a location that is different from location (s) suggested by the historical beam management report received from UE 305.

In some examples, the MRS transmitted at 320 and the additional MRSs transmitted at 335 may be associated with different RATs. For example, the base station 310 may use a cellular RAT (e.g., a mmW wireless communication system RAT) where the additional base station 315 may be associated with a Wi-Fi RAT, a New Radio (NR) RAT, etc.

At 340, the UE 305 may determine measurement parameter associated with the MRS received from additional base station 315. The measurement parameter may include or be based on a timing parameter and/or a signal strength parameter.

At 345, UE 305 may transmit an additional measurement report to base station 310 (e.g., the serving base station of UE 305). The additional measurement report from the UE 305 may be or include an indication of measurement parameter associated with the MRS transmitted at 335 from the additional base station 315. When there are more than one additional base station, the additional measurement report may provide an indication of the measurement parameters for MRSs received from each of the additional base stations. The additional measurement reports may include a separate additional measurement report for each additional base station and/or may include one additional measurement report (e.g., a comprehensive measurement report) that provides an indication of the measurement parameters for the additional base stations. The indicated measurement parameters may be associated with PRSs that are transmitted at different times according to a time offset schedule.

At 350, the base station 310 may identify the location of UE 305 based on the measurement report received at 330 and the additional measurement reports received at 345. For example, the base station 310 may use the measurement parameters indicated in the measurement report of 330 and the additional measurement reports of 345 to determine the location of UE 305 using a timing parameter, a strength parameter, or both. In some aspects, the base station 310 may identify the location of the UE 305 independently and/or may identify the location of the UE 305 by forwarding the measurement parameters to the network (e.g., mobility management entity (MME), core network function, etc.) and receiving the UE 305 location information from the network.

Figure 4:
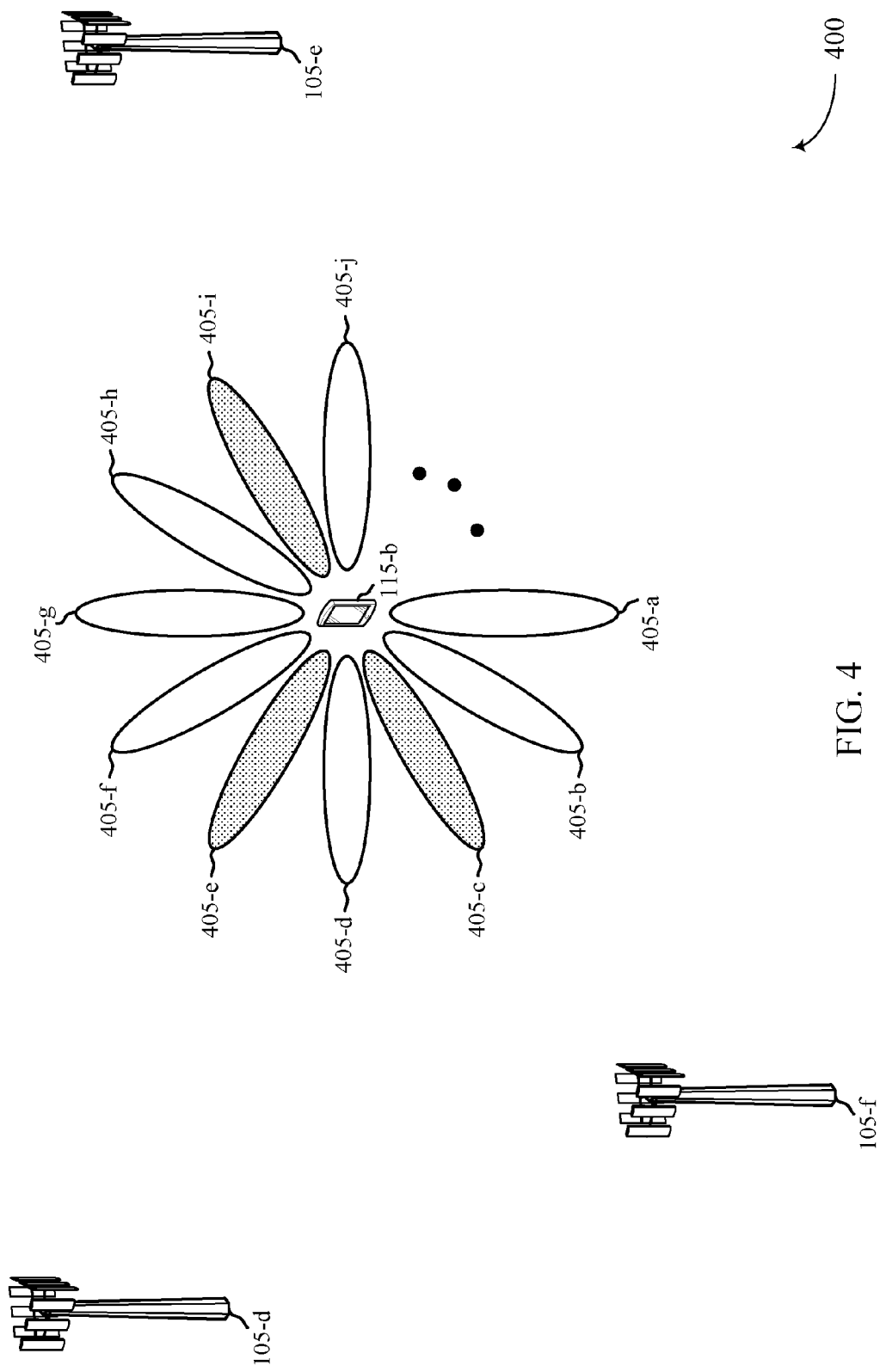
FIG. 4 illustrates an example of a wireless communication system that supports positioning in beamformed communications, such as mmW communications, in accordance with one or more aspects of the present disclosure.

FIG. 4 illustrates an example of a wireless communications system 400 for positioning in beamformed communications, such as mmW communications, in accordance with one or more aspects of the present disclosure. Wireless communications system 400 may be an example of aspects of wireless communications systems 100 and/or 200 of FIGS. 1 and 2. Wireless communications system 400 may be a mmW wireless communication system. Wireless communications system 400 may include a UE 115-b, a base station 105-d, a base station 105-f, and/or a base station 105-f, which may be examples of the corresponding devices of FIGS. 1 through 3. Broadly, wireless communications system 400 illustrates aspects of uplink based UE 115-b location determination in a beamformed wireless communication system.

In some examples, base station 105-d may be a serving base station for UE 115-b. Base stations 105-e and 105-f may be neighbor base stations for UE 115-b. Base stations 105-d, 105-e, and/or 105-f may be mmW base stations that transmit beamformed signals. UE 115-b may be a mmW UE that transmits beamformed reference signals, such as BSRSs 405. The transmissions from UE 115-b may be beamformed transmissions that are directional towards a particular base station and/or other UE.

In some aspects, UE 115-b may transmit BSRSs 405 according to a beam sweep pattern that covers all or a portion of the directions from UE 115-b. Moreover, the BSRS 405 transmissions may be time offset. For example, UE 115-b may transmit BSRS 405-a during a first TTI and in a first direction, may transmit BSRS 405-b during a second TTI and in a second direction, and so on. BSRS 405-c may for example be directed toward neighboring base station 105-f, BSRS 405-e may for example be directed toward serving base station 105-d, and BSRS 405-I may for example be directed toward neighboring base station 105-e. Thus, UE 115-b may support beamforming transmissions in a plurality of beam directions.

In some aspects, a described uplink-based positioning may reduce or avoid the complexities of PRS design and of UE measurement and reporting, as is discussed above. However, due to radio frequency and hardware limitations at the UE, the uplink beamforming gain may not be sufficient to transmit the SRS to a sufficient number of non-co-located base stations to obtain a reliable uplink measurement for positioning. As with the described downlink-based approach, this reliability may be increased to some extent by repeating in the frequency domain (i.e., SRS spanning the entire bandwidth, and also across multiple carriers).

In some aspects, UE location in a beamformed wireless communication system, such as a mmW wireless communication system, may be based on UE 115-b uplink timing and strength measurements at multiple base stations, such as base stations 105-d, 105-e, and/or 105-f. The network (e.g., core network and/or serving base station 105-d) may instruct UE 115-b to beamform an uplink reference signal to each of these base stations during a different TTI.

In some aspects, selection of the multiple base stations (e.g., base stations 105-e and/or 105-f) may be determined by the network or serving base station 105-d based on previous beam management reports from the UE 115-b. The selection may be based on previously reported strong neighbor base station beams. Selection may be based on beams from base stations that were not previously reported as strong neighbors, but which the network identifies as likely to improve position accuracy, based on previous reports and/or on a tentative UE 115-b location computed based on those previous reports.

In the example of a multicarrier system, the network may directing UE 115-b to beamform the BSRS 405 to a particular base station may apply to the multiple carriers in the same TTI, and the base station may combine the BSRS 405 across carriers.

Figure 5:
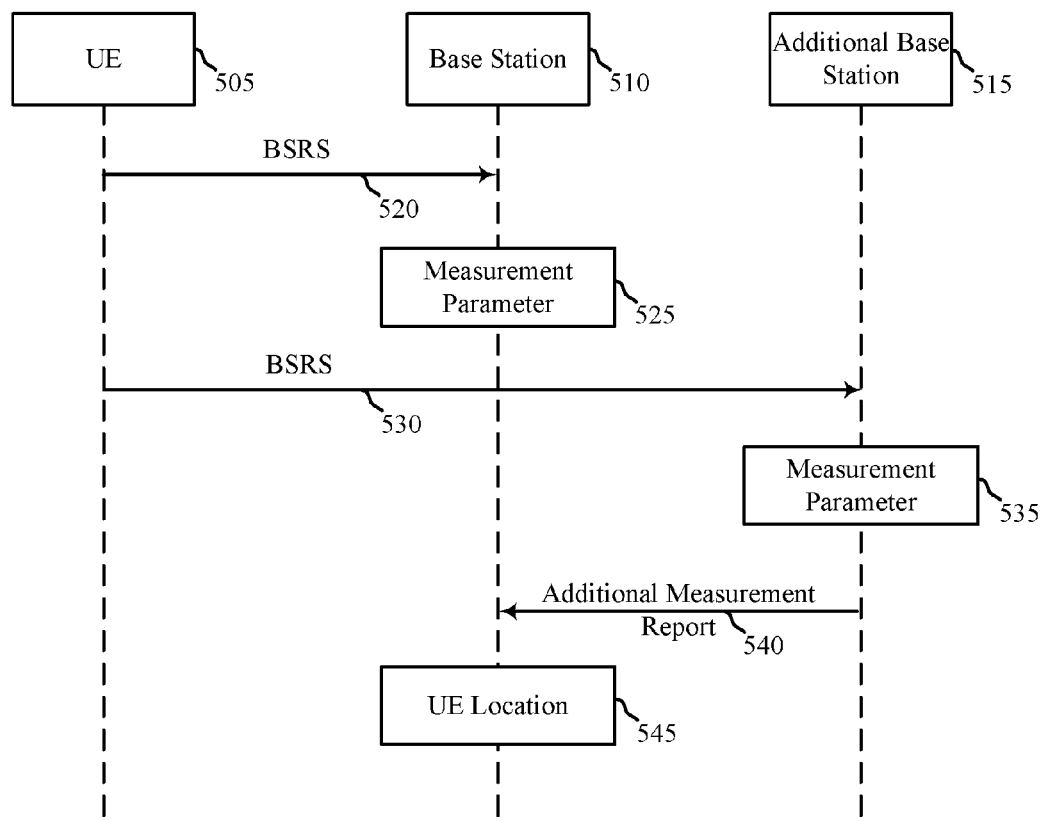
FIG. 5 illustrates an example of a process flow that supports positioning in beamformed communications, such as mmW communications, in accordance with one or more aspects of the present disclosure.

FIG. 5 illustrates an example of a process flow 500 for positioning in beamformed communications, such as mmW communications, in accordance with one or more aspects of the present disclosure. Process flow 500 may implement aspects of wireless communications system 100, 200, and/or 400 of FIGS. 1, 2, and/or 4. Process flow 500 may include a UE 505, a base station 510, and at least one additional base station 515, which may be examples of the corresponding devices of FIGS. 1 through 4. It is to be understood that the process flow 500 is not limited to one additional base station 515. Base station 510 may be a serving base station for UE 505.

At 520, UE 505 may transmit a BSRS to base station 510. The BSRS may be transmitted in a beam direction directed towards base station 510. Thus, base station 510 may receive the BSRS from UE 505. In some examples, the BSRS transmitted may include multiple BSRSs from the UE 505 where each BSRS is associated with different carriers and are transmitted in the same TTI.

At 525, base station 510 may determine a measurement parameter associated with the BSRS received at 520. The measurement parameter may include a timing parameter and/or a strength parameter. In the multicarrier example, base station 510 may combine the multiple BSRSs to determine the measurement parameter.

At 530, UE 505 may transmit a BSRS to additional base station 515. The BSRS may be transmitted in a beam direction directed towards additional base station 515. Thus, additional base station 515 may receive the BSRS from UE 505. At 535, additional base station 515 may determine a measurement parameter associated with the BSRS received at 530. The measurement parameter may include a timing parameter and/or a strength parameter.

In some aspects, base station 510 may transmit to UE 505 an indication of which additional base stations to be used by UE 505 for transmissions of the additional BSRS. The additional base stations may be selected based on historical beam management reports received from the UE 505. In some examples, the additional base stations may be selected based on a prediction that the UE 505 is located in a location that is different from location(s) suggested by the historical beam management reports received from UE 505.

In some aspects, the BSRS transmitted at 520 and the additional BSRS transmitted at 530 may be associated with different RATs, as is discussed above.

At 540, base station 510 may receive an additional measurement report from additional base station 515, e.g., via backhaul link S1, S2, etc. The additional measurement report may include an indication of the measurement parameters associated with the BSRS received at 530. At 545, base station 510 may identify the UE 505 location based on the measurement parameter determined at 525 and the additional measurement parameters indicated in the additional measurement reports received at 540.

Figure 6:
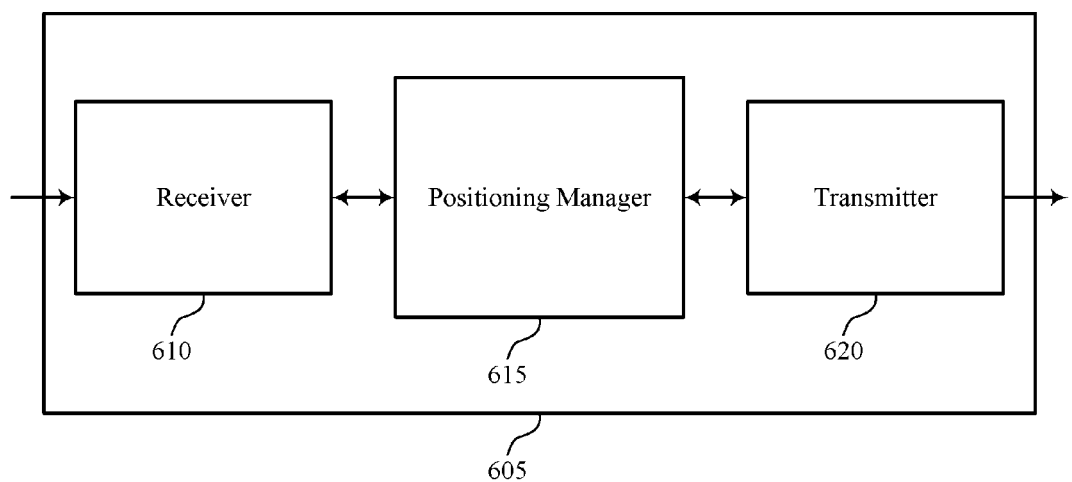
FIGS. 6 through 8 show block diagrams of a device that supports positioning in beamformed communications, such as mmW communications, in accordance with one or more aspects of the present disclosure.

FIG. 6 shows a block diagram 600 of a wireless device 605 that supports positioning in beamformed communications, such as mmW communications, in accordance with one or more aspects of the present disclosure. Wireless device 605 may be an example of aspects of a base station 105 as described with reference to FIGS. 1 through 5. Wireless device 605 may include receiver 610, positioning manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to positioning in beamformed communications, such as mmW communications, etc.). Information may be passed on to other components of the device. The receiver 610 may be an example of aspects of the transceiver 935 described with reference to FIG. 9.

Positioning manager 615 may be an example of aspects of the base station positioning manager 101 and/or positioning manager 915 described with reference to FIGS. 1 and/or 9. Positioning manager 615 may receive a first measurement report from a UE, the first measurement report indicating a measurement parameter associated with a first beamformed reference signal, receive additional measurement reports from the UE for additional base stations, the additional measurement reports each indicating measurement parameters associated with additional beamformed reference signals transmitted by the additional base stations, and identify a location of the UE based on the first measurement report and the additional measurement reports.

The positioning manager 615 may additionally or alternatively receive a first BSRS from a UE, determine a measurement parameter associated with the first BSRS, receive measurement reports from additional base stations, the measurement reports each indicating measurement parameters associated with additional BSRSs beamformed and transmitted by the UE to the additional base stations, and identify a location of the UE based on the determined measurement parameter and the additional measurement reports.

Transmitter 620 may transmit signals generated by other components of the device. In some examples, the transmitter 620 may be collocated with a receiver 610 in a transceiver. For example, the transmitter 620 may be an example of aspects of the transceiver 935 described with reference to FIG. 9. The transmitter 620 may include a single antenna, or it may include a set or panel of antennas.

Figure 7:
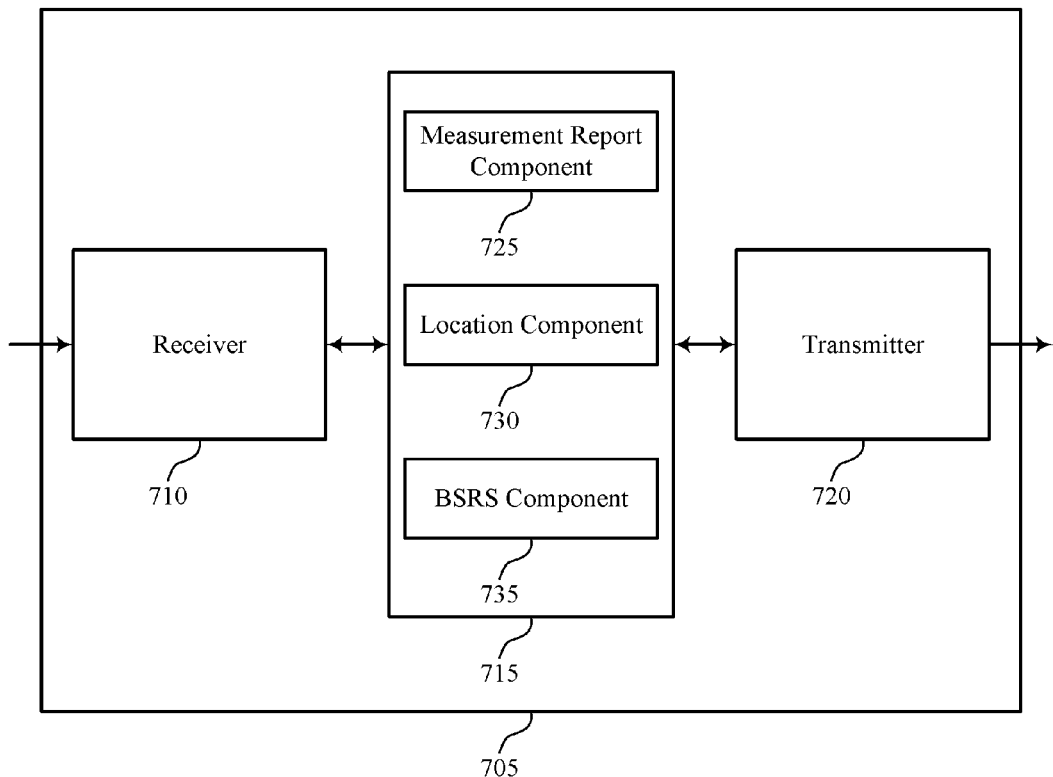

FIG. 7 shows a block diagram 700 of a Wireless device 705 that supports positioning in beamformed communications, such as mmW communications, in accordance with one or more aspects of the present disclosure. Wireless device 705 may be an example of aspects of a wireless device 605 or a base station 105 as described with reference to FIGS. 1 through 6. Wireless device 705 may include receiver 710, positioning manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to positioning in beamformed communications, such as mmW communications, etc.). Information may be passed on to other components of the device. The receiver 710 may be an example of aspects of the transceiver 935 described with reference to FIG. 9.

Positioning manager 715 may be an example of aspects of the positioning manager 915 described with reference to FIG. 9. Positioning manager 715 may also include measurement report component 725, location component 730, and BSRS component 735.

Measurement report component 725 may, in a downlink-based approach, receive a first measurement report from a UE, the first measurement report indicating a measurement parameter associated with a first beamformed reference signal, and receive additional measurement reports from the UE for additional base stations, the additional measurement reports each indicating measurement parameters associated with additional beamformed reference signals transmitted by the additional base stations. Measurement report component 725 may additionally or alternatively, in an uplink-based approach, receive measurement reports from additional base stations, the measurement reports each indicating measurement parameters associated with additional BSRSs beamformed and transmitted by the UE to the additional base stations. The measurement parameter(s), for the downlink-approach and/or the uplink-based approach, may include or be based on a timing parameter or measurement (e.g., OTDOA (for downlink), uplink time difference of arrival (UL-TDOA) (for uplink), time of arrival, angle of arrival, angle of departure at the UE, etc.). The measurement parameter(s) may include or be based on a signal strength parameter, e.g., received power level, received power level relative to a reference power level, etc.

In some cases, receiving additional measurement reports from the UE additionally or alternatively includes: receiving additional measurement reports indicating measurement parameters associated with PRSs that are transmitted at different times in accordance to a time offset schedule. In some cases, receiving the first measurement report further includes receiving, from the UE, a single first measurement report indicating measurement parameters associated with each of the multiple carriers. In some cases, the measurement parameters are associated with timing measurements of the first beamformed reference signal and the additional reference signals, strength measurements of the first beamformed reference signal and the additional reference signals, or combinations thereof. In some cases, at least one of the additional beamformed reference signals is associated with a RAT that is different from a RAT associated with the first beamformed reference signal.

Location component 730 may identify a location of the UE based on the first measurement report and the additional measurement reports. In some cases, identifying the location of the UE additionally or alternatively includes computing the location of the UE based on the determined measurement parameter and the additional measurement reports.

BSRS component 735 may receive a first BSRS from a UE and determine a measurement parameter associated with the first BSRS. In some cases, receiving the first BSRS from the UE additionally or alternatively includes: receiving multiple first BSRSs from the UE, each of the first BSRSs being associated with different carriers and being transmitted by the UE in a same TTI. In some cases, at least one of the additional BSRSs is associated with a RAT that is different from a RAT associated with the first BSRS.

Transmitter 720 may transmit signals generated by other components of the device. In some examples, the transmitter 720 may be collocated with a receiver 710 in a transceiver. For example, the transmitter 720 may be an example of aspects of the transceiver 935 described with reference to FIG. 9. The transmitter 720 may include a single antenna, or it may include a set or panel of antennas.

Figure 8:
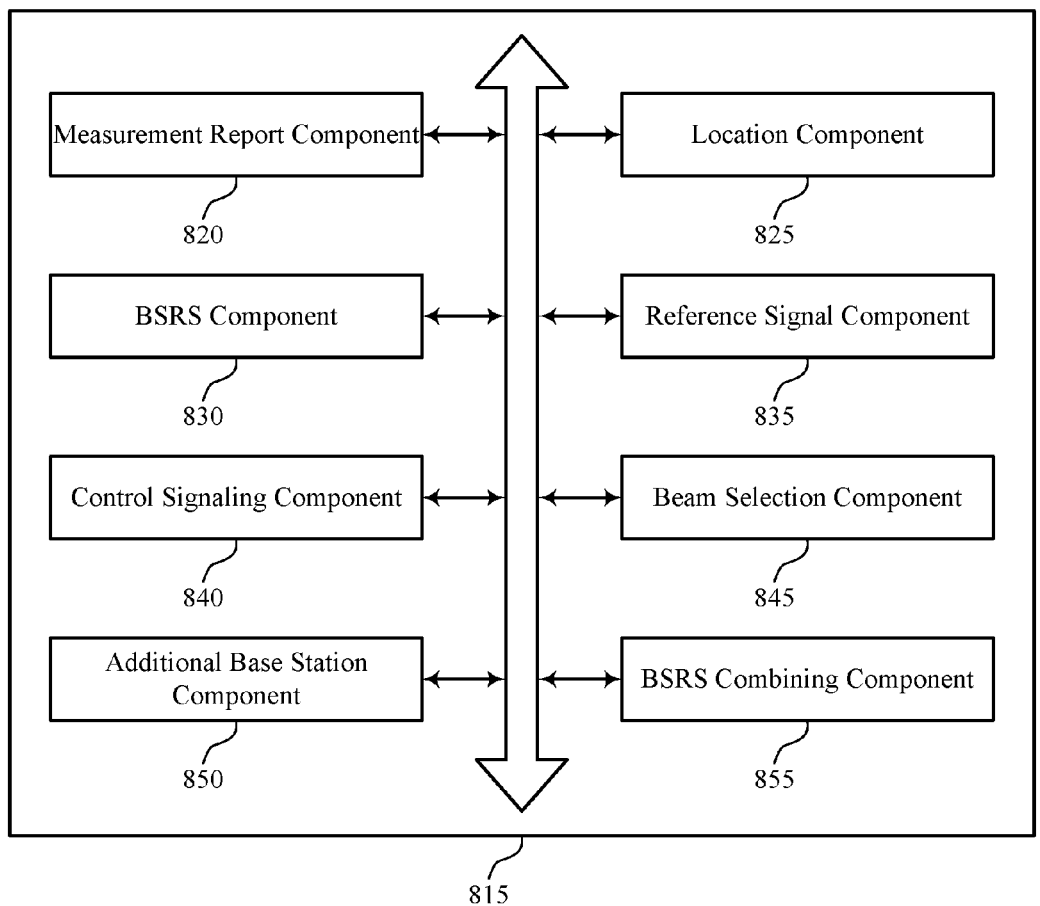

FIG. 8 shows a block diagram 800 of a positioning manager 815 that supports positioning in beamformed communications, such as mmW communications, in accordance with one or more aspects of the present disclosure. The positioning manager 815 may be an example of aspects of a positioning manager 615, a positioning manager 715, or a positioning manager 915 described with reference to FIGS. 6, 7, and 9. The positioning manager 815 may include measurement report component 820, location component 825, BSRS component 830, reference signal component 835, control signaling component 840, beam selection component 845, additional base station component 850, and BSRS combining component 855. Each of these components may communicate, directly or indirectly, with one another (e.g., via one or more buses).

Measurement report component 820 may, in a downlink-based scenario, receive a first measurement report from a UE, the first measurement report indicating a measurement parameter associated with a first beamformed reference signal, and receive additional measurement reports from the UE for additional base stations, the additional measurement reports each indicating measurement parameters associated with additional beamformed reference signals transmitted by the additional base stations. Measurement report component 820 may additionally or alternatively, in an uplink-based scenario, receive measurement reports from additional base stations, the measurement reports each indicating measurement parameters associated with additional BSRSs beamformed and transmitted by the UE to the additional base stations.

Location component 825 may identify a location of the UE based on the first measurement report and the additional measurement reports. BSRS component 830 may receive a first BSRS from a UE and determine a measurement parameter associated with the first BSRS.

Reference signal component 835 may transmit the first beamformed reference signal as a non-positioning beam management signal or a measurement reference signal, transmit the first beamformed reference signal as a PRS piggybacked to an MRS, broadcast the PRS via beam sweeping, transmit the PRS over a subset of beams directed towards the UE, and transmit the first beamformed reference signal according to a periodic schedule, an aperiodic schedule, on an as-needed basis, or combinations thereof. In some cases, transmitting the PRS additionally or alternatively includes: transmitting the PRS for each of multiple carriers that share a same beam by sharing a same antenna panel and by being aligned in time.

Control signaling component 840 may transmit, to the UE, control signaling associated with the PRS prior to transmitting the first beamformed reference signal.

Beam selection component 845 may select the subset of beams based on a historical beam management report received from the UE and select the subset of beams based on a prediction that the UE is located in a location that is different from one or more locations suggested by a historical beam management report received from the UE.

Additional base station component 850 may transmit to the UE an indication of the additional base stations to be used by the UE for transmission of the additional BSRSs and select the additional base stations based on historical beam management reports received from the UE. In some cases, selecting the additional base stations additionally or alternatively includes: selecting the additional base stations based on a prediction that the UE is located in a location that is different from one or more locations suggested by the historical beam management report received from the UE.

BSRS combining component 855 may combine the multiple first BSRSs to determine the measurement parameter associated with the first BSRS.

Figure 9:
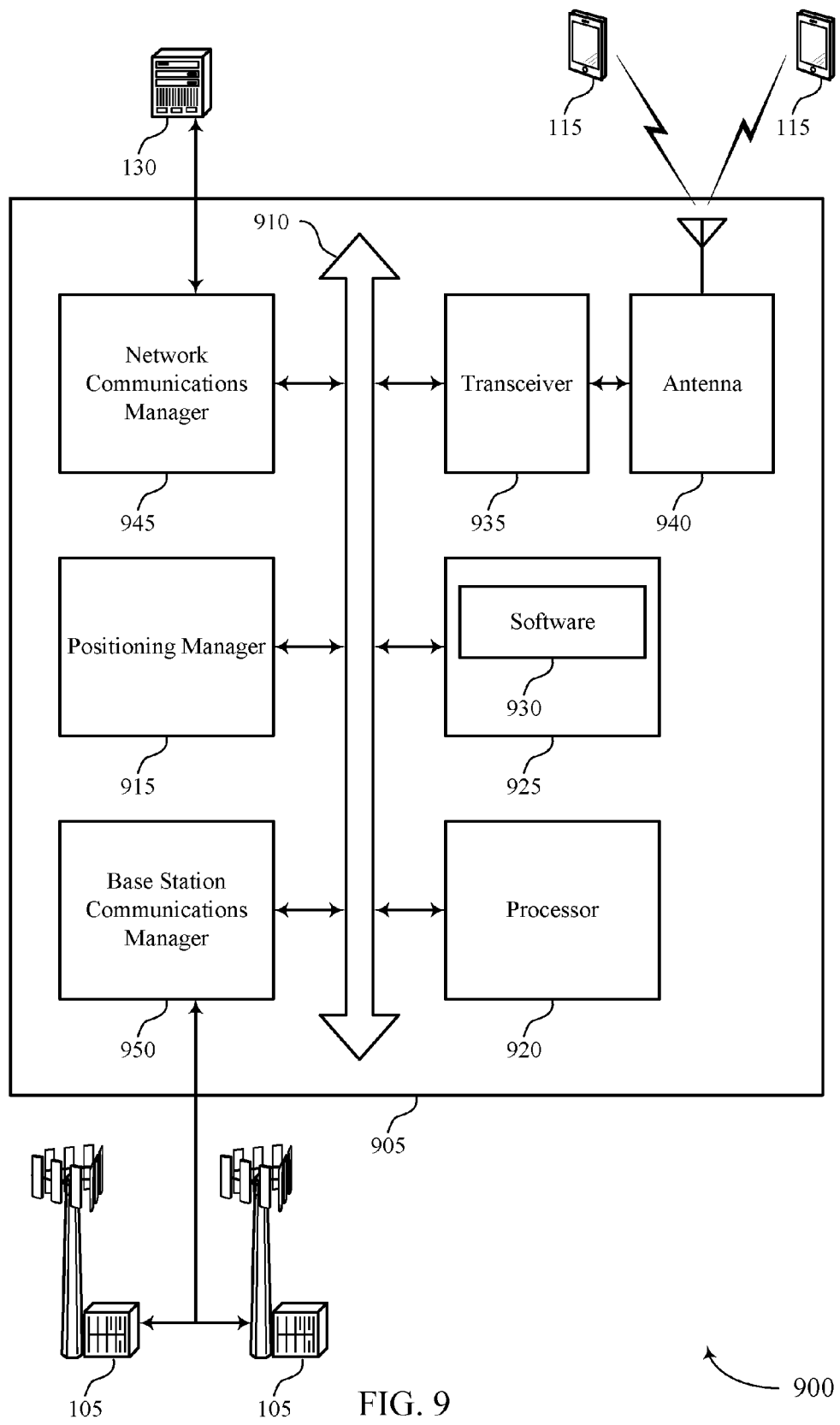
FIG. 9 illustrates a block diagram of a system including a base station that supports positioning in beamformed communications, such as mmW communications, in accordance with one or more aspects of the present disclosure.

FIG. 9 shows a diagram of a system 900 including a device 905 that supports positioning in beamformed communications, such as mmW communications, in accordance with one or more aspects of the present disclosure. Device 905 may be an example of or include the components of wireless device 605, wireless device 705, or a base station 105 as described above, e.g., with reference to FIGS. 1 through 7. Device 905 may include components for bi-directional voice and data communications including components for transmitting and receiving communications, including positioning manager 915, processor 920, memory 925, software 930, transceiver 935, antenna 940, network communications manager 945, and base station communications manager 950.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting positioning in beamformed communications, such as mmW communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support positioning in beamformed communications, such as mmW communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940 or one or more antenna panels, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other base station 105, and may include a controller or scheduler for controlling communications with UEs 115 in cooperation with other base stations 105. For example, the base station communications manager 950 may coordinate scheduling for transmissions to UEs 115 for various interference mitigation techniques such as beamforming or joint transmission. In some examples, base station communications manager 950 may provide an X2 interface within an LTE/LTE-A wireless communication network technology to provide communication between base stations 105.

Figure 10:
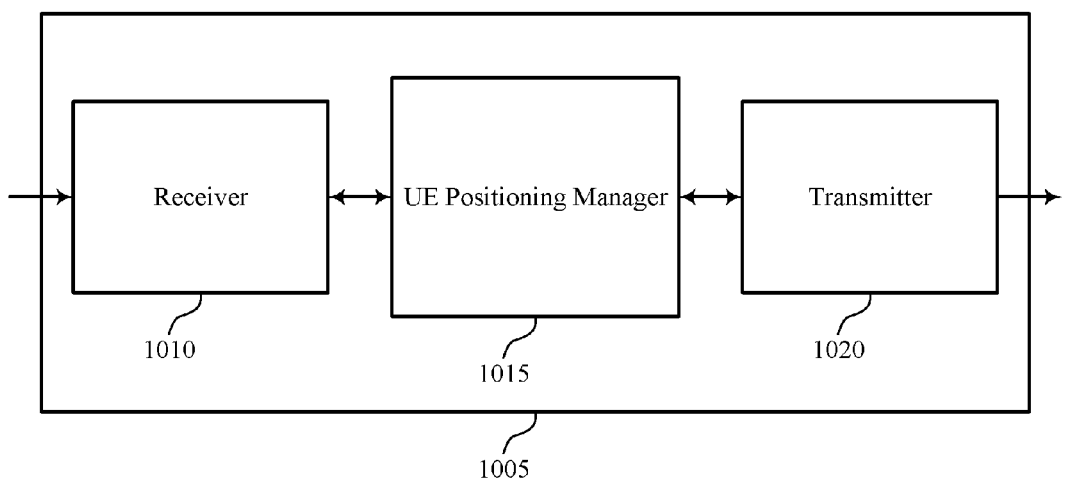
FIGS. 10 through 12 show block diagrams of a device that supports positioning in beamformed communications, such as mmW communications, in accordance with one or more aspects of the present disclosure.

FIG. 10 shows a block diagram 1000 of a wireless device 1005 that supports positioning in beamformed communications, such as mmW communications, in accordance with one or more aspects of the present disclosure. Wireless device 1005 may be an example of aspects of a UE 115 as described with reference to FIG. 1 through 5. Wireless device 1005 may include receiver 1010, UE positioning manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to positioning in beamformed communications, such as mmW communications, etc.). Information may be passed on to other components of the device. The receiver 1010 may be an example of aspects of the transceiver 1335 described with reference to FIG. 13.

UE positioning manager 1015 may be an example of aspects of a UE positioning manager 1115, a UE positioning manager 1215, or a UE positioning manager 1315 described with reference to FIGS. 11, 12, and 13. UE positioning manager 1015 may transmit by a UE to a base station, a first measurement report, the first measurement report indicating a measurement parameter associated with a first beamformed reference signal, and transmit by the UE to the base station, additional measurement reports for additional base stations, the additional measurement reports each indicating measurement parameters associated with additional beamformed reference signals that are transmitted at different times in accordance to a time offset schedule by the additional base stations, wherein the first measurement report and the additional measurement reports are configured to allow the base station to identify a location of the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas or antenna panels.

Figure 11:
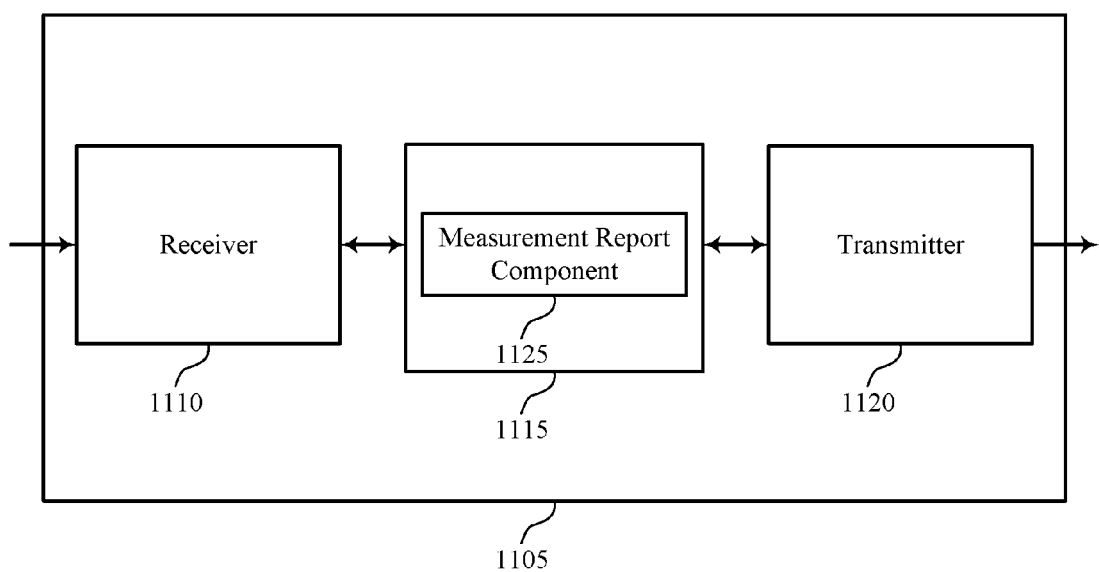

FIG. 11 shows a block diagram 1100 of a wireless device 1105 that supports positioning in beamformed communications, such as mmW communications, in accordance with one or more aspects of the present disclosure. Wireless device 1105 may be an example of aspects of a wireless device 1005 or a UE 115 as described with reference to FIGS. 1 through 5 and 10. Wireless device 1105 may include receiver 1110, UE positioning manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to positioning in beamformed communications, such as mmW communications, etc.). Information may be passed on to other components of the device. The receiver 1110 may be an example of aspects of the transceiver 1335 described with reference to FIG. 13.

UE positioning manager 1115 may be an example of aspects of a UE positioning manager 1015, a UE positioning manager 1215, or a UE positioning manager 1315 described with reference to FIGS. 10, 12, and 13. UE positioning manager 1115 may additionally or alternatively include measurement report component 1125.

Measurement report component 1125 may, in an uplink-based approach, transmit a first measurement report from a UE to a base station, the first measurement report indicating a measurement parameter associated with a first beamformed reference signal, and transmit additional measurement reports by the UE for additional base stations, the additional measurement reports each indicating measurement parameters associated with additional beamformed reference signals that are transmitted at different times in accordance to a time offset schedule by the additional base stations. The measurement parameter(s), for downlink-approach and/or uplink-based approach, may include or be based on a timing parameter or measurement (e.g., OTDOA (for downlink), UL-TDOA (for uplink), time of arrival, angle of arrival, angle of departure at the UE, etc.). The measurement parameter(s) may include or be based on a signal strength parameter, e.g., received power level, received power level relative to a reference power level, etc.

In some cases, transmitting the first measurement report additionally or alternatively includes transmitting, by the UE, a single first measurement report indicating measurement parameters associated with each of the multiple carriers. In some cases, the measurement parameters are associated with timing measurements of the first beamformed reference signal and the additional reference signals, strength measurements of the first beamformed reference signal and the additional reference signals, or combinations thereof. In some cases, at least one of the additional beamformed reference signals is associated with a RAT that is different from a RAT associated with the first beamformed reference signal.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas or antenna panels.

Figure 12:
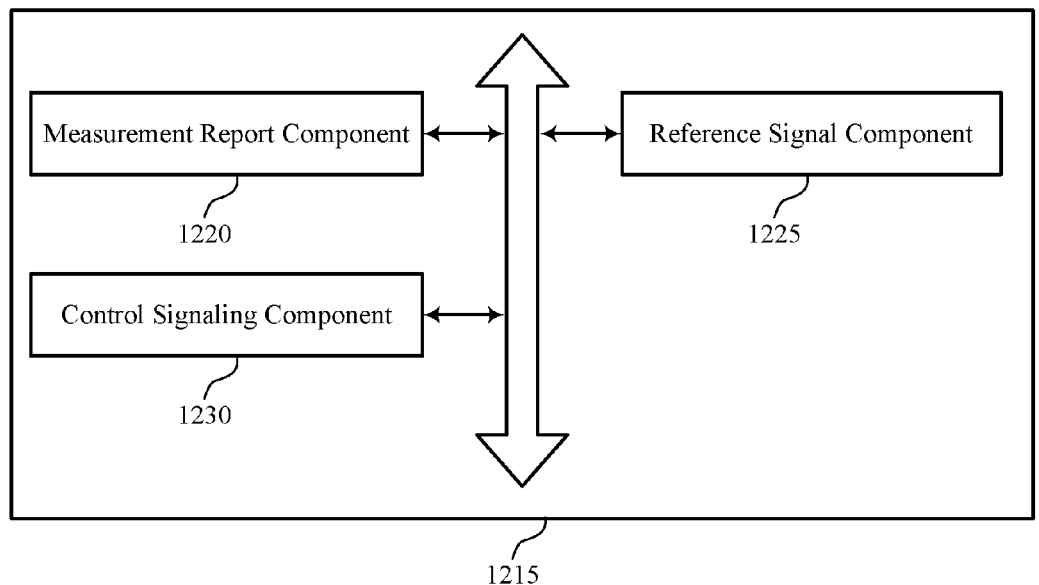

FIG. 12 shows a block diagram 1200 of a UE positioning manager 1215 that supports positioning in beamformed communications, such as mmW communications, in accordance with one or more aspects of the present disclosure. UE positioning manager 1215 may be an example of aspects of a UE positioning manager 1015, a UE positioning manager 1115, or a UE positioning manager 1315 described with reference to FIGS. 10, 11, and 13. UE positioning manager 1215 may include measurement report component 1220, reference signal component 1225, and control signaling component 1230. Each of these components may communicate, directly or indirectly, with one another (e.g., via one or more buses).

Measurement report component 1220 may, in an uplink-based scenario, transmit by a UE to a base station, a first measurement report, the first measurement report indicating a measurement parameter associated with a first beamformed reference signal, and transmit by the UE to the base station, additional measurement reports for additional base stations, the additional measurement reports each indicating measurement parameters associated with additional beamformed reference signals that are transmitted at different times in accordance to a time offset schedule by the additional base stations, wherein the first measurement report and the additional measurement reports are configured to allow the base station to identify a location of the UE.

Reference signal component 1225 may receive the first beamformed reference signal as a non-positioning beam management signal or a measurement reference signal, receive the first beamformed reference signal as a PRS, receive from the base station, the PRS over a subset of beams directed towards the UE, and receiving the PRS additionally or alternatively includes: receiving the PRS for each of multiple carriers that share a same beam by sharing a same antenna panel and by being aligned in time.

Control signaling component 1230 may receive, from the base station, control signaling associated with the PRS prior to receiving the first beamformed reference signal.

Figure 13:
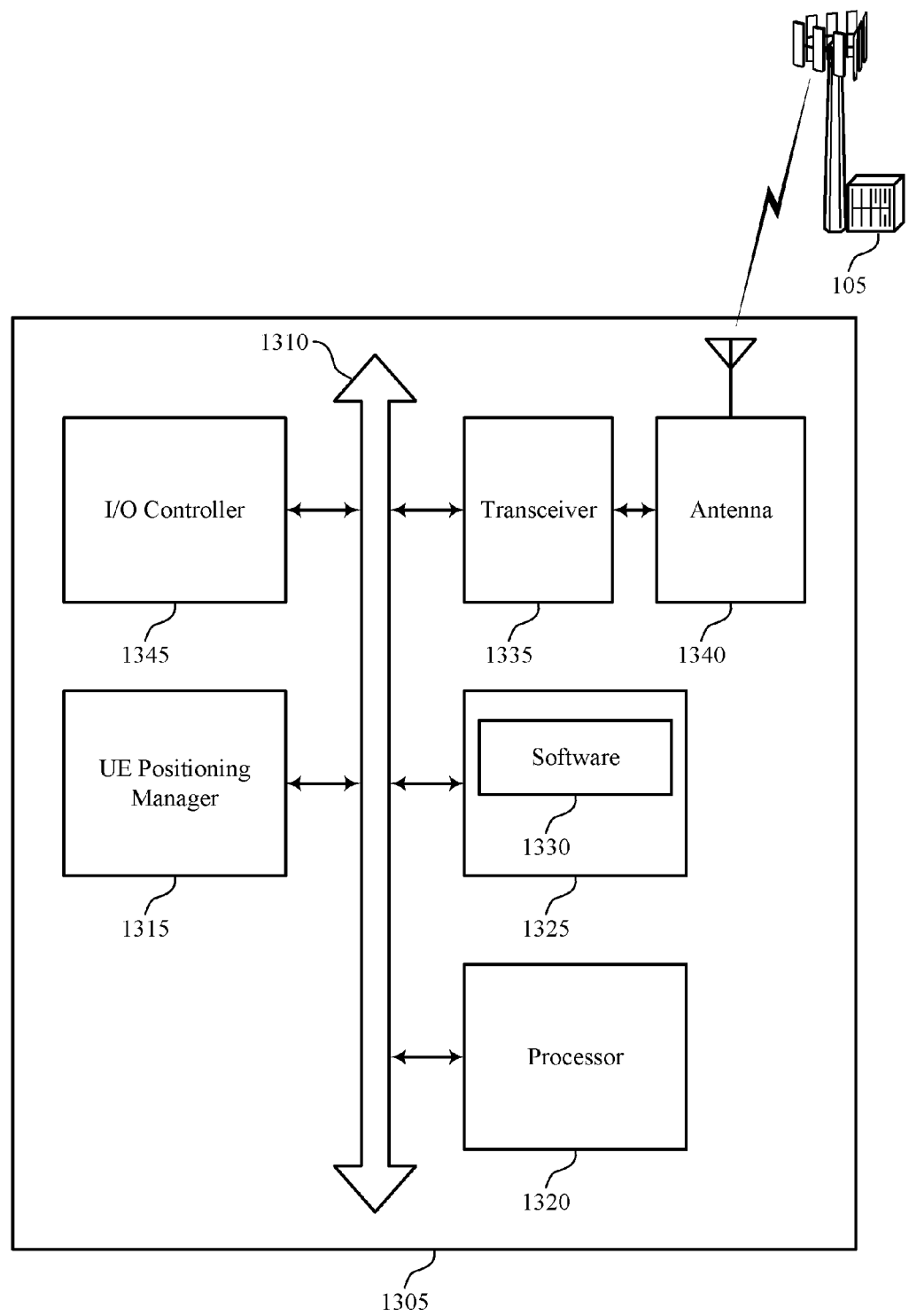
FIG. 13 illustrates a block diagram of a system including a UE that supports positioning in beamformed communications, such as mmW communications, in accordance with one or more aspects of the present disclosure.

FIG. 13 shows a diagram of a system 1300 including a device 1305 that supports positioning in beamformed communications, such as mmW communications, in accordance with one or more aspects of the present disclosure. Device 1305 may be an example of or include the components of UE 115 as described above, e.g., with reference to FIGS. 1 through 5. Device 1305 may include components for bi-directional voice and data communications including components for transmitting and receiving communications, including UE positioning manager 1315, processor 1320, memory 1325, software 1330, transceiver 1335, antenna 1340, and I/O controller 1345.

Processor 1320 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting positioning in beamformed communications, such as mmW communications).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support positioning in beamformed communications, such as mmW communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions. In some cases the device may have one or more antenna panels that may be used for beamformed transmission.

I/O controller 1345 may manage input and output signals for device 1305. Input/output control component 1345 may additionally or alternatively manage peripherals not integrated into device 1305. In some cases, input/output control component 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
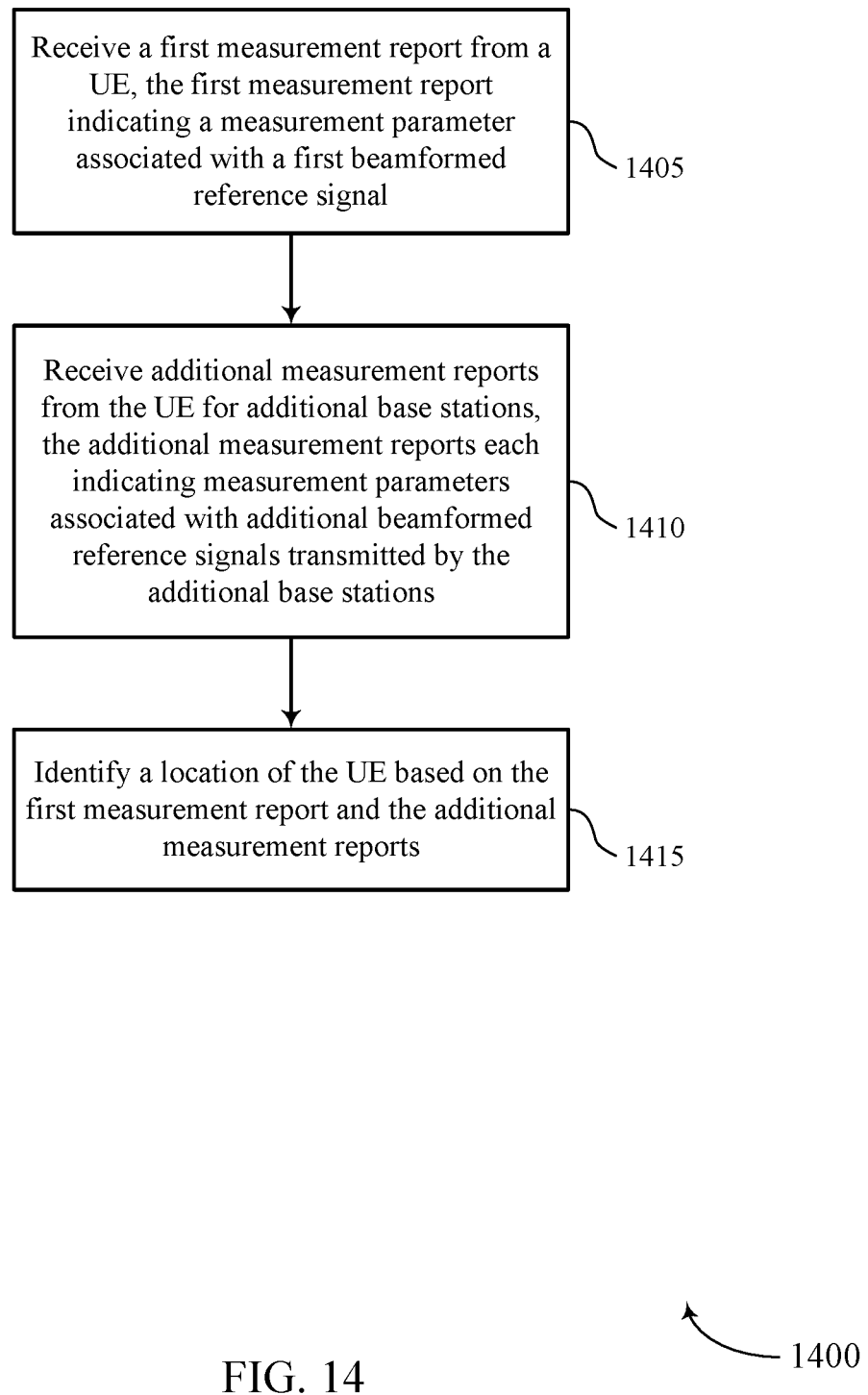
FIGS. 14 through 18 illustrate methods for positioning in beamformed communications, such as mmW communications, in accordance with one or more aspects of the present disclosure.

FIG. 14 shows a flowchart illustrating a method 1400 for positioning in beamformed communications, such as mmW communications, in accordance with one or more aspects of the present disclosure. The operations of method 1400 may be implemented by a base station 105 or its components as described herein. For example, the operations of method 1400 may be performed by a positioning manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware. The operations of method 1400 may represent downlink-based positioning.

At block 1405 the base station 105 may receive a first measurement report from a UE, the first measurement report indicating a measurement parameter associated with a first beamformed reference signal. The operations of block 1405 may be performed according to the techniques described with reference to FIGS. 1 through 5. In some examples, aspects of the operations of block 1405 may be performed by a measurement report component as described with reference to FIGS. 6 through 9.

At block 1410 the base station 105 may receive additional measurement reports from the UE for additional base stations, the additional measurement reports each indicating measurement parameters associated with additional beamformed reference signals transmitted by the additional base stations. The operations of block 1410 may be performed according to the techniques described with reference to FIGS. 1 through 5. In some examples, aspects of the operations of block 1410 may be performed by a measurement report component as described with reference to FIGS. 6 through 9.

At block 1415 the base station 105 may identify a location of the UE based on the first measurement report and the additional measurement reports. The operations of block 1415 may be performed according to the techniques described with reference to FIGS. 1 through 5. In some examples, aspects of the operations of block 1415 may be performed by a location component as described with reference to FIGS. 6 through 9.

Figure 15:
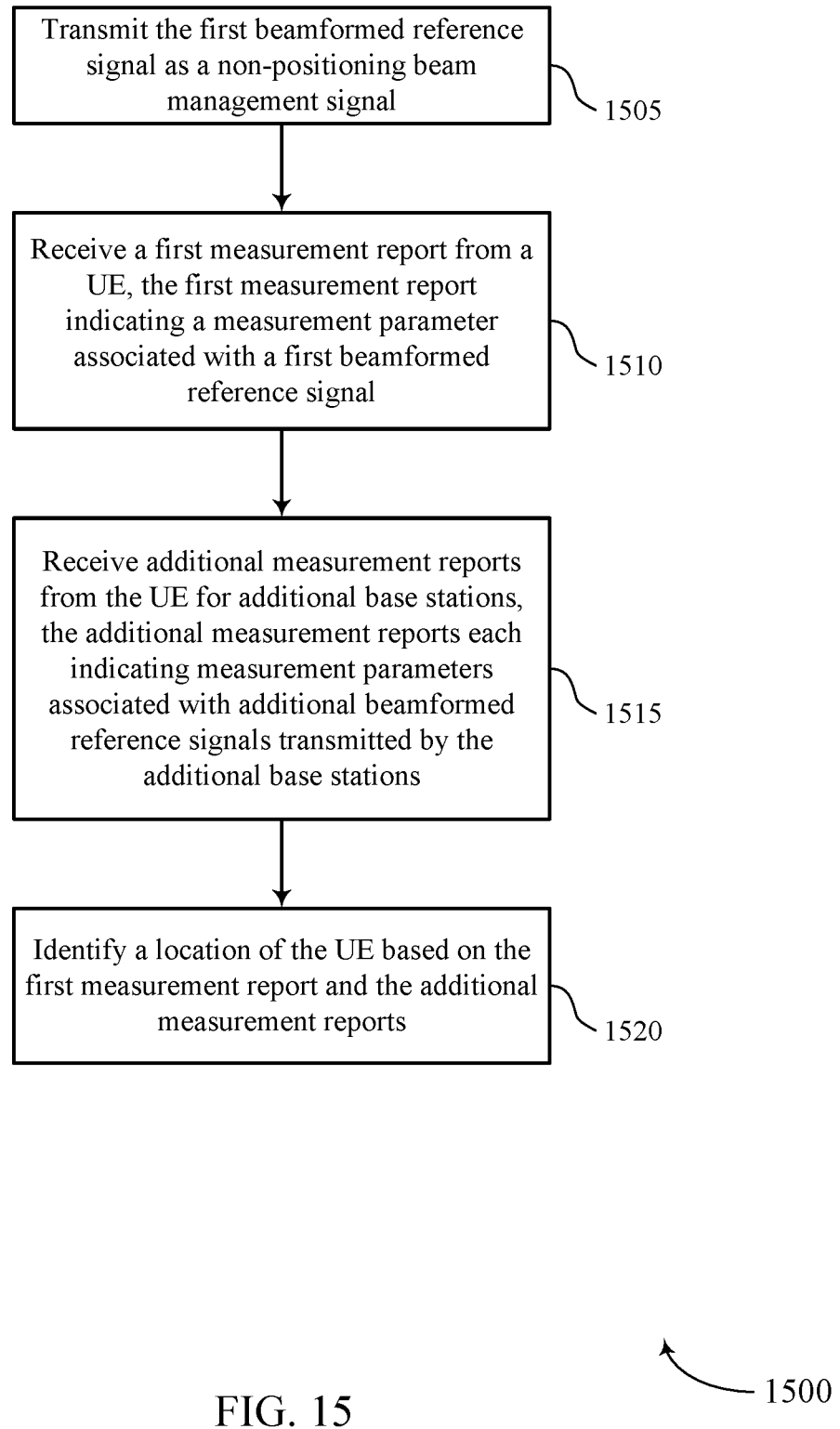

FIG. 15 shows a flowchart illustrating a method 1500 for positioning in beamformed communications, such as mmW communications, in accordance with one or more aspects of the present disclosure. The operations of method 1500 may be implemented by a base station 105 or its components as described herein. For example, the operations of method 1500 may be performed by a positioning manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware. The operations of method 1500 may represent downlink-based positioning.

At block 1505 the base station 105 may transmit the first beamformed reference signal as a non-positioning beam management signal or a measurement reference signal. The operations of block 1505 may be performed according to the techniques described with reference to FIGS. 1 through 5. In some examples, aspects of the operations of block 1505 may be performed by a reference signal component as described with reference to FIGS. 6 through 9.

At block 1510 the base station 105 may receive a first measurement report from a UE, the first measurement report indicating a measurement parameter associated with a first beamformed reference signal. The operations of block 1510 may be performed according to the techniques described with reference to FIGS. 1 through 5. In some examples, aspects of the operations of block 1510 may be performed by a measurement report component as described with reference to FIGS. 6 through 9.

At block 1515 the base station 105 may receive additional measurement reports from the UE for additional base stations, the additional measurement reports each indicating measurement parameters associated with additional beamformed reference signals transmitted by the additional base stations. The operations of block 1515 may be performed according to the techniques described with reference to FIGS. 1 through 5. In some examples, aspects of the operations of block 1515 may be performed by a measurement report component as described with reference to FIGS. 6 through 9.

At block 1520 the base station 105 may identify a location of the UE based on the first measurement report and the additional measurement reports. The operations of block 1520 may be performed according to the techniques described with reference to FIGS. 1 through 5. In some examples, aspects of the operations of block 1520 may be performed by a location component as described with reference to FIGS. 6 through 9.

Figure 16:
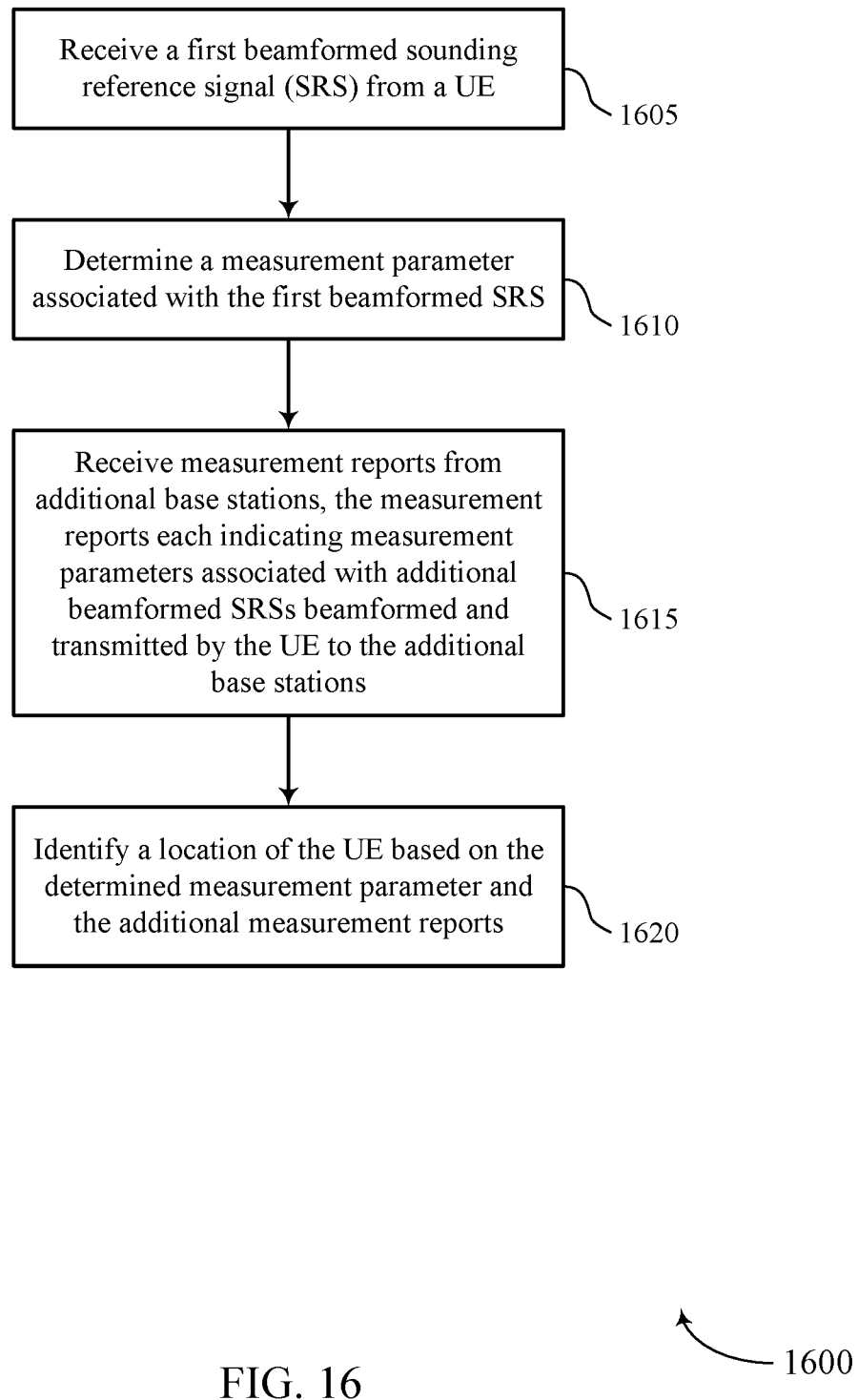

FIG. 16 shows a flowchart illustrating a method 1600 for positioning in beamformed communications, such as mmW communications, in accordance with one or more aspects of the present disclosure. The operations of method 1600 may be implemented by a base station 105 or its components as described herein. For example, the operations of method 1600 may be performed by a positioning manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware. The operations of method 1600 may represent uplink-based positioning.

At block 1605 the base station 105 may receive a first beamformed SRS from a UE. The operations of block 1605 may be performed according to the techniques described with reference to FIGS. 1 through 5. In some examples, aspects of the operations of block 1605 may be performed by a SRS component as described with reference to FIGS. 6 through 9.

At block 1610 the base station 105 may determine a measurement parameter associated with the first beamformed SRS. The operations of block 1610 may be performed according to the techniques described with reference to FIGS. 1 through 5. In some examples, aspects of the operations of block 1610 may be performed by a SRS component as described with reference to FIGS. 6 through 9.

At block 1615 the base station 105 may receive measurement reports from additional base stations, the measurement reports each indicating measurement parameters associated with additional beamformed SRSs beamformed and transmitted by the UE to the additional base stations. In some examples, any location determination entity may receive measurement reports from additional base stations. In some examples, the location determination entity may be located elsewhere in the network and may receive measurement reports from the additional base stations, wherein the beamformed SRSs are transmitted to the additional base stations by the UE 115. In some examples, the location determination entity may be a serving base station or another entity such as an E-SMLC. The operations of block 1615 may be performed according to the techniques described with reference to FIGS. 1 through 5. In some examples, aspects of the operations of block 1615 may be performed by a measurement report component as described with reference to FIGS. 6 through 9.

At block 1620 the base station 105 may identify a location of the UE based on the determined measurement parameter and the additional measurement reports. The operations of block 1620 may be performed according to the techniques described with reference to FIGS. 1 through 5. In some examples, aspects of the operations of block 1620 may be performed by a location component as described with reference to FIGS. 6 through 9.

Figure 17:
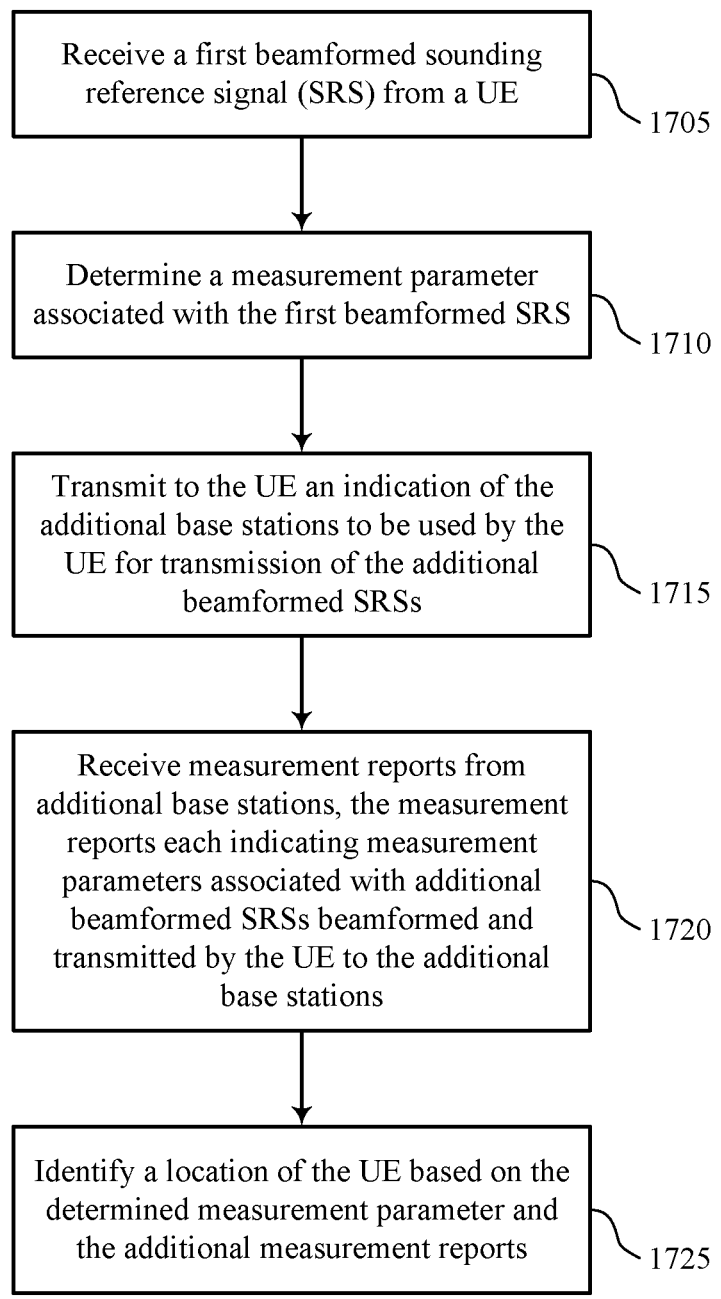

FIG. 17 shows a flowchart illustrating a method 1700 for positioning in beamformed communications, such as mmW communications, in accordance with one or more aspects of the present disclosure. The operations of method 1700 may be implemented by a base station 105 or its components as described herein. For example, the operations of method 1700 may be performed by a positioning manager as described with reference to FIGS. 6 through 9. In some examples, a base station 105 may execute a set of codes to control the functional elements of the device to perform the functions described below. Additionally or alternatively, the base station 105 may perform aspects the functions described below using special-purpose hardware. The operations of method 1700 may represent uplink-based positioning.

At block 1705 the base station 105 may receive a first beamformed SRS from a UE. The operations of block 1705 may be performed according to the techniques described with reference to FIGS. 1 through 5. In some examples, aspects of the operations of block 1705 may be performed by a SRS component as described with reference to FIGS. 6 through 9.

At block 1710 the base station 105 may determine a measurement parameter associated with the first beamformed SRS. The operations of block 1710 may be performed according to the techniques described with reference to FIGS. 1 through 5. In some examples, aspects of the operations of block 1710 may be performed by a SRS component as described with reference to FIGS. 6 through 9.

At block 1715 the base station 105 may transmit to the UE an indication of the additional base stations to be used by the UE for transmission of the additional beamformed SRSs. The operations of block 1715 may be performed according to the techniques described with reference to FIGS. 1 through 5. In some examples, aspects of the operations of block 1715 may be performed by an additional base station component as described with reference to FIGS. 6 through 9.

At block 1720 the base station 105 may receive measurement reports from additional base stations, the measurement reports each indicating measurement parameters associated with additional beamformed SRSs beamformed and transmitted by the UE to the additional base stations. The operations of block 1720 may be performed according to the methods described with reference to FIGS. 1 through 5. In some examples, aspects of the operations of block 1720 may be performed by a measurement report component as described with reference to FIGS. 6 through 9.

At block 1725 the base station 105 may identify a location of the UE based on the first measurement report and the additional measurement reports. The operations of block 1725 may be performed according to the techniques described with reference to FIGS. 1 through 5. In some examples, aspects of the operations of block 1725 may be performed by a location component as described with reference to FIGS. 6 through 9.

Figure 18:
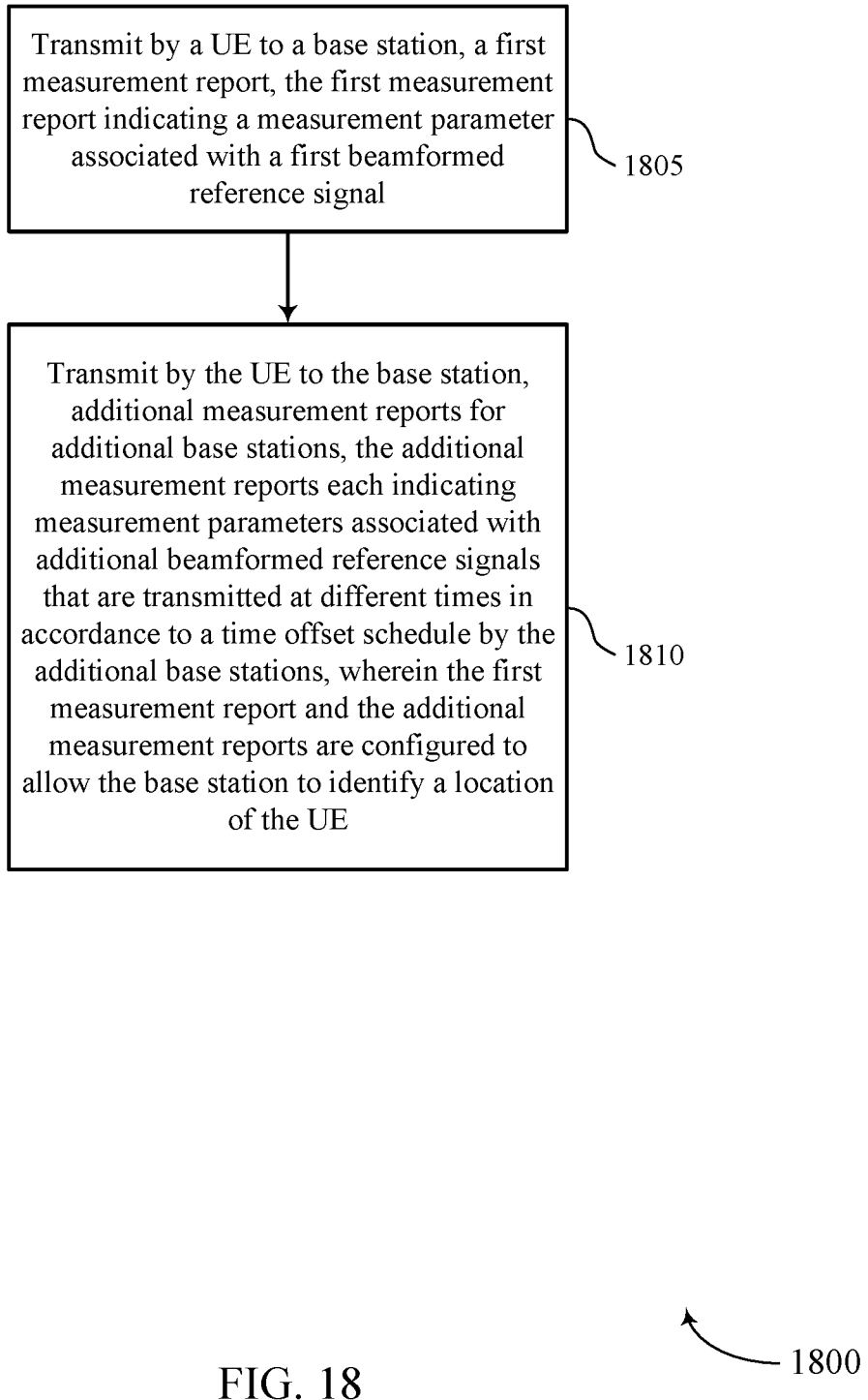

FIG. 18 shows a flowchart illustrating a method 1800 for positioning in beamformed communications, such as mmW communications, in accordance with one or more aspects of the present disclosure. The operations of method 1800 may be implemented by a UE 115 or its components as described herein. For example, the operations of method 1800 may be performed by a UE positioning manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware. The operations of method 1800 may represent uplink-based positioning.

At block 1805 the UE 115 may transmit to a base station, a first measurement report, the first measurement report indicating a measurement parameter associated with a first beamformed reference signal. The operations of block 1805 may be performed according to the techniques described with reference to FIGS. 1 through 5. In some examples, aspects of the operations of block 1805 may be performed by a measurement report component as described with reference to FIGS. 10 through 13.

At block 1810 the UE 115 may transmit to the base station, additional measurement reports for additional base stations, the additional measurement reports each indicating measurement parameters associated with additional beamformed reference signals that are transmitted at different times in accordance to a time offset schedule by the additional base stations, wherein the first measurement report and the additional measurement reports are configured to allow the base station to identify a location of the UE. The operations of block 1810 may be performed according to the techniques described with reference to FIGS. 1 through 5. In some examples, aspects of the operations of block 1810 may be performed by a measurement report component as described with reference to FIGS. 10 through 13.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may for example be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, macro gNBs, small cell gNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may additionally or alternatively be called forward link transmissions while the uplink transmissions may additionally or alternatively be called reverse link transmissions. Each communication link described herein—including, for example, wireless communications system 100, 200, and 400 of FIGS. 1, 2, and 4—may include one or more carriers, where each carrier may be a signal made up of multiple sub-carriers (e.g., waveform signals of different frequencies).

The description set forth herein, in connection with the appended drawings, describes examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such example).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for location determination in beamformed communication, comprising:
   transmitting by a user equipment (UE) to a base station, a first measurement report, the first measurement report indicating a measurement parameter associated with a first beamformed reference signal; and
   transmitting by the UE to the base station, additional measurement reports for additional base stations, the additional measurement reports each indicating measurement parameters associated with additional beamformed reference signals that are transmitted at different times in accordance to a time offset schedule by the additional base stations,
   wherein the first measurement report and the additional measurement reports are configured to allow the base station to identify a location of the UE.

2. The method of claim 1, further comprising:
   receiving the first beamformed reference signal as a non-positioning beam management signal or a measurement reference signal.

3. The method of claim 1, further comprising:
   receiving the first beamformed reference signal as a positioning reference signal (PRS).

4. The method of claim 3, wherein
   receiving, from the base station, control signaling associated with the PRS prior to receiving the first beamformed reference signal.

5. The method of claim 3, wherein
   receiving from the base station, the PRS over a subset of beams directed towards the UE.

6. The method of claim 3, wherein
   receiving the PRS further comprises: receiving the PRS for each of multiple carriers that share a same beam by sharing a same antenna panel and by being aligned in time; and
   transmitting the first measurement report further comprises: transmitting, by the UE, a single first measurement report indicating measurement parameters associated with each of the multiple carriers.

7. The method of claim 1, wherein
   at least one of the additional beamformed reference signals is associated with a radio access technology (RAT) that is different from a RAT associated with the first beamformed reference signal.

8. A method for location determination in beamformed communication, comprising:
   receiving a first measurement report from a user equipment (UE), the first measurement report indicating a measurement parameter associated with a first beamformed reference signal;

receiving additional measurement reports from the UE for additional base stations, the additional measurement reports each indicating measurement parameters associated with additional beamformed reference signals that are transmitted at different times in accordance to a time offset schedule by the additional base stations; and identifying a location of the UE based at least in part on the first measurement report and the additional measurement reports.

9. The method of claim 8, further comprising:
transmitting the first beamformed reference signal as a non-positioning beam management signal or a measurement reference signal.

10. The method of claim 8, further comprising:
transmitting the first beamformed reference signal as a positioning reference signal (PRS).

11. The method of claim 10, further comprising:
transmitting, to the UE, control signaling associated with the PRS prior to transmitting the first beamformed reference signal.

12. The method of claim 10, further comprising:
broadcasting the PRS via beam sweeping.

13. The method of claim 10, further comprising:
transmitting the PRS over a subset of beams directed towards the UE.

14. The method of claim 10, wherein
receiving additional measurement reports from the UE further comprises: receiving additional measurement reports indicating measurement parameters associated with PRSs that are transmitted at different times in accordance to the time offset schedule.

15. The method of claim 10, wherein
transmitting the PRS further comprises: transmitting the PRS for each of multiple carriers that share a same beam by sharing a same antenna panel and by being aligned in time; and
receiving the first measurement report further comprises: receiving, from the UE, a single first measurement report indicating measurement parameters associated with each of the multiple carriers.

16. The method of claim 13, further comprising:
selecting the subset of beams based at least in part on a historical beam management report received from the UE.

17. The method of claim 13, further comprising:
selecting the subset of beams based at least in part on a prediction that the UE is located in a location that is different from one or more locations suggested by a historical beam management report received from the UE.

18. The method of claim 8, wherein
the measurement parameters are associated with timing measurements of the first beamformed reference signal and the additional beamformed reference signals, strength measurements of the first beamformed reference signal and the additional beamformed reference signals, or combinations thereof.

19. The method of claim 8, wherein
at least one of the additional beamformed reference signals is associated with a radio access technology (RAT) that is different from a RAT associated with the first beamformed reference signal.

20. An apparatus for beamformed communication, comprising:
a processor;
memory in electronic communication with the processor; and
instructions stored in the memory, the instructions being executable by the processor to:
transmit by a user equipment (UE) to a base station, a first measurement report, the first measurement report indicating a measurement parameter associated with a first beamformed reference signal; and
transmit by the UE to the base station, additional measurement reports for additional base stations, the additional measurement reports each indicating measurement parameters associated with additional beamformed reference signals that are transmitted at different times in accordance to a time offset schedule by the additional base stations,
wherein the first measurement report and the additional measurement reports are configured to allow the base station to identify a location of the UE.

21. The apparatus of claim 20, wherein the instructions are further executable by the processor to:
receive the first beamformed reference signal as a non-positioning beam management signal or a measurement reference signal.

22. The apparatus of claim 20, wherein the instructions are further executable by the processor to:
receive the first beamformed reference signal as a positioning reference signal (PRS).

23. The apparatus of claim 22, wherein the instructions are further executable by the processor to:
receive, from the base station, control signaling associated with the PRS prior to receiving the first beamformed reference signal.

24. An apparatus for beamformed communication, comprising:
a processor;
memory in electronic communication with the processor; and
instructions stored in the memory, the instructions being executable by the processor to:
receive a first measurement report from a user equipment (UE), the first measurement report indicating a measurement parameter associated with a first beamformed reference signal;
receive additional measurement reports from the UE for additional base stations, the additional measurement reports each indicating measurement parameters associated with additional beamformed reference signals that are transmitted at different times in accordance to a time offset schedule by the additional base stations; and
identify a location of the UE based at least in part on the first measurement report and the additional measurement reports.

25. The apparatus of claim 24, wherein the instructions are further executable by the processor to:
transmit the first beamformed reference signal as a non-positioning beam management signal or a measurement reference signal.

26. The apparatus of claim 24, wherein the instructions are further executable by the processor to:
transmit the first beamformed reference signal as a positioning reference signal (PRS).

27. The apparatus of claim 26, wherein the instructions are further executable by the processor to:

transmit to the UE, control signaling associated with the PRS prior to transmitting the first beamformed reference signal.

28. The apparatus of claim 26, wherein the instructions are further executable by the processor to:
broadcast the PRS via beam sweeping.

29. The apparatus of claim 26, wherein the instructions are further executable by the processor to:
transmit the PRS over a subset of beams directed towards the UE.

30. The apparatus of claim 29, wherein the instructions are further executable by the processor to:
select the subset of beams based at least in part on a historical beam management report received from the UE.

* * * * *